United States Patent
Gargano et al.

(10) Patent No.: US 12,481,665 B1
(45) Date of Patent: Nov. 25, 2025

(54) CONFIGURABLE INTERACTIVE COMPONENTS FOR STRUCTURED QUERY RESULTS

(71) Applicant: Amazon Technologies, Inc., Seattle, WA (US)

(72) Inventors: Keith Gargano, Culver City, CA (US); Ryan Barlow Dall, Culver City, CA (US); Stefan Joseph Wojciechowski, Winnetka, CA (US); Joshua Anthony Marsh, Culver City, CA (US); Andrew Jeremy Crews, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/899,531

(22) Filed: Sep. 27, 2024

(51) Int. Cl.
   *G06F 16/2452*  (2019.01)
   *G06F 16/2457*  (2019.01)
   *G06F 16/248*   (2019.01)
   *G06F 21/62*    (2013.01)

(52) U.S. Cl.
   CPC .. *G06F 16/24575* (2019.01); *G06F 16/24526* (2019.01); *G06F 16/248* (2019.01); *G06F 21/6218* (2013.01)

(58) Field of Classification Search
   CPC ......... G06F 16/24575; G06F 16/24526; G06F 16/248; G06F 21/6218
   See application file for complete search history.

(56) References Cited

U.S. PATENT DOCUMENTS

| | | | |
|---|---|---|---|
| 9,172,621 B1 | 10/2015 | Dippenaar | |
| 9,268,841 B2 * | 2/2016 | Mattox | G06F 16/248 |
| 9,582,534 B1 * | 2/2017 | Hoover | G06F 16/245 |
| 11,763,016 B2 * | 9/2023 | Blass | G06F 21/6218 |
| | | | 707/722 |
| 12,326,869 B1 * | 6/2025 | Alperin | G06N 3/04 |
| 2012/0253984 A1 * | 10/2012 | Westphal | G06F 16/951 |
| | | | 707/706 |
| 2019/0196890 A1 | 6/2019 | Bucchi et al. | |

(Continued)

FOREIGN PATENT DOCUMENTS

WO   2016138566 A1   9/2016

OTHER PUBLICATIONS

NEO4J, Inc., "Neo4j for GenAI—Ground LLMs with Knowledge Graphs," www.neo4j.com, Neo4j, Inc. Accessed Sep. 11, 2024. URL: https://neo4j.com/GENERATIVEAI/.

(Continued)

*Primary Examiner* — Jorge A Casanova
(74) *Attorney, Agent, or Firm* — Athorus, PLLC

(57) ABSTRACT

Described are systems and processes providing meaningful responses to natural language (NL) prompts issued by a user and providing the responses to the user with configurable interactive components selected based in part on a role of the user that enables the user to engage with the responses in meaningful ways. The configurable interactive components may enable a user to perform certain tasks with output data in a response, such as play content, edit content, and/or perform actions by implementation of software code added to the configurable interactive components. The actions may include implementing approvals, sending electronic messages, and/or scheduling meetings, among many other actions.

20 Claims, 12 Drawing Sheets

(56) References Cited

U.S. PATENT DOCUMENTS

| | | | |
|---|---|---|---|
| 2020/0004980 A1* | 1/2020 | Blass | G06F 16/2465 |
| 2021/0144066 A1 | 5/2021 | Marinucci et al. | |
| 2021/0149851 A1 | 5/2021 | Belezko et al. | |
| 2023/0045347 A1 | 2/2023 | Grady | |
| 2023/0289339 A1 | 9/2023 | Sagar | |
| 2023/0359667 A1 | 11/2023 | Zionts et al. | |
| 2024/0134857 A1* | 4/2024 | Gladwin | G06F 16/24545 |
| 2024/0281472 A1* | 8/2024 | LaRhette | G06F 16/9558 |
| 2025/0139106 A1* | 5/2025 | Rao Karikurve | G06F 16/24578 |
| 2025/0148289 A1* | 5/2025 | Mukherjee | G06F 16/248 |
| 2025/0148308 A1* | 5/2025 | Vinay | G06F 40/30 |
| 2025/0217418 A1* | 7/2025 | Bathwal | G06F 16/24575 |

OTHER PUBLICATIONS

NEO4J, Inc., "NeoConverse—Graph Database Search with Natural Language," www.neo4j.com, Neo4j, Inc. Accessed Sep. 11, 2024, URL: https://neo4j.com/labs/genai-ecosystem/neoconverse/.

Ong, Ryan, "Claude Artifacts 101: Types, Use Cases, Sharing, and Remixing," www.datacamp.com, DataCamp, Inc., Jul. 2024, URL: https://www.datacamp.com/blog/claude-artifacts-introduction, 16 pages.

U.S. Appl. No. 17/892,813, filed Aug. 22, 2022, entitled "Unified Graph of Disparate Data Domains," 57 pages.

Vesoft Inc., "NebulaGraph Launches Industry-First Graph RAG: Retrieval-Augmented Generation with LLM Based on Knowledge Graphs," Sep. 6, 2023, www.nebula-graph.io, NebulaGraph, vesoft Inc., Accessed Sep. 11, 2024, URL: https://www.nebula-graph.io/posts/graph-RAG.

* cited by examiner

CONFIGURABLE INTERACTIVE COMPONENTS FOR STRUCTURED QUERY RESULTS

CROSS-REFERENCE TO RELATED APPLICATION

This application is related to application Ser. No. 18/899,499, entitled "Natural Language Conversion to Structured Graph Queries" filed on the same date of Sep. 27, 2024, the disclosure of which is incorporated by reference herein in its entirety.

BACKGROUND

Businesses often store interrelated data across various databases and services. This data is often formatted and stored in different ways and sometimes difficult to extract to create meaningful information, especially by users that are unfamiliar with the data structures and organization of the data. Users want ready access to this data and underlying knowledge. Users have become accustomed to interaction with virtual assistances through intuitive conversations and often prefer this approach to obtaining data over manually writing queries and performing research using multiple sources, which can sometime take hours to complete.

Virtual assistants provide answers to prompts using static output mechanisms. For example, some virtual assistants are limited to providing text or audio outputs to provide answers to users. However, users often expect answers that are customized based on attributes of the user, which may allow the user to more readily process the results or make the results more meaningful.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
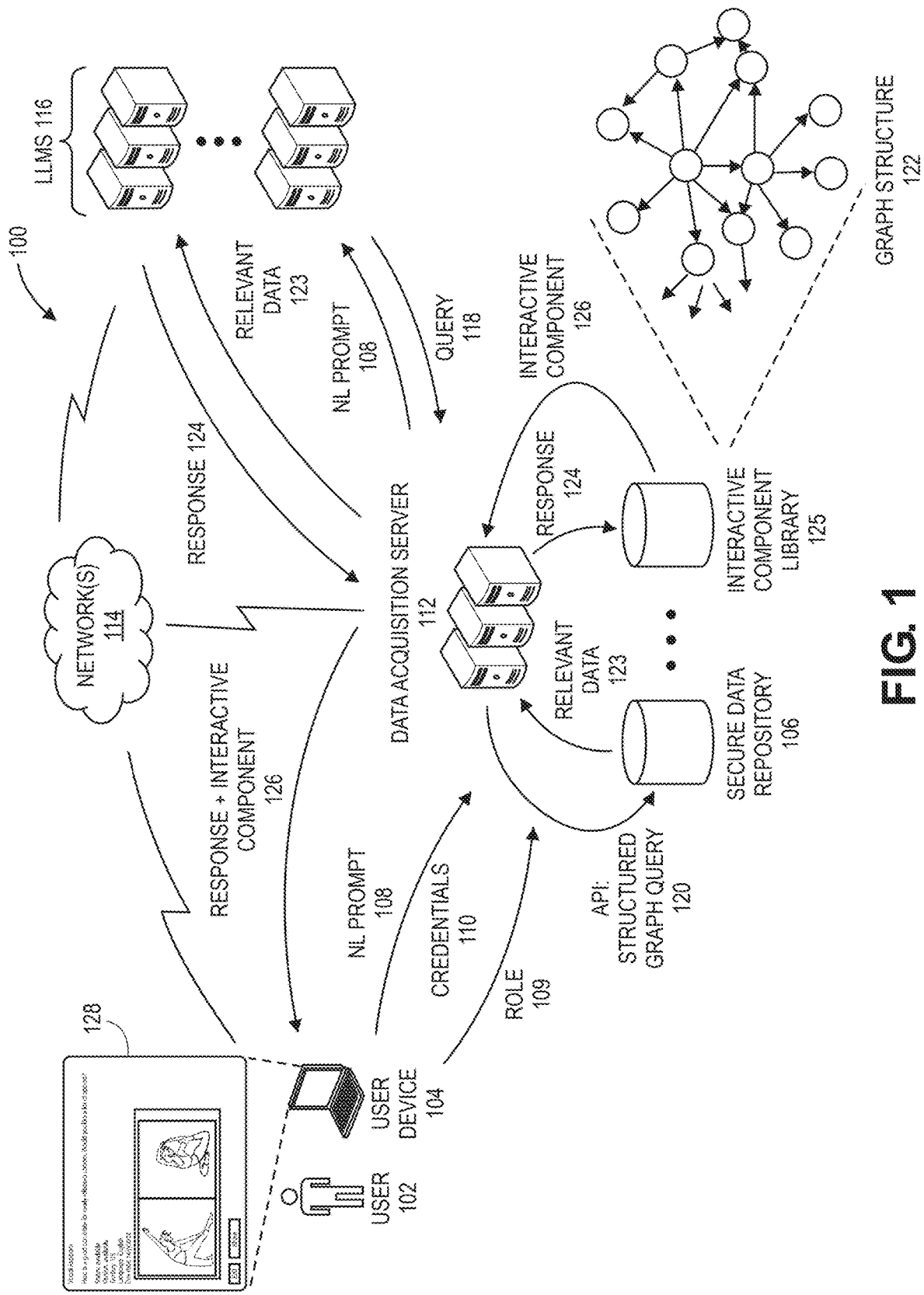
FIG. 1 is a schematic diagram showing an illustrative environment to provide configurable interactive components for structured query results, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes using configurable interactive components to provide data or other information to users and/or perform actions on behalf of a user in response to natural language (NL) prompts provided by a user. The configurable interactive components may be user interfaces (UIs) and/or components used with user interfaces. The configurable interactive components may be selected based on the natural language prompt, a role of the user, credentials of the user, intended use of the data, and/or relevant data from a data repository queried to respond to the prompt. As an example, a marketing executive at an organization may receive information via a different configurable interactive component than a software engineer at the same organization due to distinct differences in their roles in the organization and how data may be best understood by those workers, assuming both workers submitted similar NL prompts to the system.

In some embodiments, the configurable interactive components may use visual metaphors relevant to the user to provide formatting information to display output data, such as by transforming data into tables, charts, or other formatted data. In various embodiments, the configurable interactive components may include commands that enable a user to take certain actions through executing of software code, such as send an electronic message to a recipient, schedule a meeting, approve a request, and so forth. In one or more embodiments, the configurable interactive components may execute some functions on behalf of a user through software code, such as by approving a request on behalf of the user by using the user's credentials.

Large Language Models (LLMs) may be used to process natural language prompts and extract relevant data from one or more proprietary data repositories. In some embodiments, a data repository may be mapped by a unified graph schema to expedite acquisition of relevant data across heterogeneous data sources in the data repository. Relevant data that a user is permissioned to access is returned from the data repositories to enable the LLMs to answer the prompt. The unified graph schema may represent the underlying federated graphs of data stored in the heterogeneous systems.

The proprietary data may be structured and organized for retrieval using precise graph queries over the unified graph schema representing the underlying data. A data mesh can be used to associate data across various systems. The data mesh can expose one unified graph of data for all applications. The unified graph can serve as a single point of extraction of trusted information. The schema may use a schema definition language that describes the graph with edges between vertices declaratively. Vertices may represent entities like titles, people, etc. Edges may show relationships between vertices (e.g., entities). The schema may be enhanced with semantic labels from a knowledge graph, which may assist language models to better understand schema elements. Contextual recommendations may be used to associate the configurable interactive components to output data, such as by selecting suitable visual encodings based on data types linked in the schema. Users may then reformulate prompts and the system reshapes dynamic views using the configurable interactive components, accordingly, revealing insights and interactions interactively.

The system may receive a natural language prompt as input from a user. Encoded language models compare the structural-semantic graph schema against the prompt to extract entities and relationships that can satisfy the prompt. The system constructs a formal graph traversal querying connected elements to satisfy the interpreted user goal. Traversals specify root vertices, connection edges, filters over properties, and projected data outputs. An output may be a standards-based Graph Query Language string executed on the federated graph databases. The system may verify permissions and apply governance controls when querying so that users get secured, authorized results tuned to their context.

The system interprets natural language inputs similar to Retrieval Augmented Generation (RAG) models using encoded models. The system uses a unified graph schema as disclosed in co-owned, U.S. patent application Ser. No. 17/892,813 filed on the $22^{nd}$ day of August 2022, which is incorporated herein by reference in its entirety. The unified graph schema is interposed and enhanced with semantics between interpretation and storage. Rather than directly embedding retrieved data, structured queries are constructed and executed that project permissioned results responsive to the user context.

The system provides an enhanced Graph Query Language schema with knowledge graph semantic labels. The system matches natural language interpretations to schema elements by semantics and assembles schema elements into formal graph traversals. The system then executes queries over federated graphs in standard Graph Query Language to augment context of prompts and return meaningful output data using the configurable interactive components interaction by users. While the advantages of this approach are many, the system may provide a graph model connecting data, components, and users. The system may also provide conversational flows composed with data views for user interaction. The system may further provide contextual linking of projected data, organizational context, and user intent into the configurable interactive components, such as interface widgets. The system may also create adaptive interactive experiences for users to interact with data through a unique lens of the user's role via the configurable interactive components.

Therefore, users of the system(s) further disclosed below with reference to FIGS. 1-10 can converse naturally with a system to create NL prompts while maximizing accuracy and security of the system and obtaining meaningful results generated from proprietary data that are provided by configurable interactive components to provide the user not only the requested data, but ways to interact with the data that are meaningful for that particular user. The configurable interactive components may accelerate user productivity through automated workflows, make enterprise data actionable through self-service, increase accessibility for technical and non-technical workers based on their roles, and allow flexible explorations of output data adapted to evolving needs of the user based on the user's interact with the system.

FIG. 1 is a schematic diagram showing an illustrative environment 100 to provide configurable interactive components for structured query results, according to an implementation. The environment 100 may include a user 102 associated with a user device 104. The user 102 may desire to extract certain information from a secure data repository 106. For example, the user 102 may desire information to create a report or may want information from the secure data repository 106 for other purposes. Meanwhile, the secure data repository 106 may be continually updated to include current information that is proprietary for a person, organization, or other entity or group of entities. The secure data repository 106 may be protected by a firewall and/or other security measures to prevent unauthorized access to data within the secure data repository 106.

To obtain the desired data, the user 102 may submit a natural language prompt 108 (or "NL prompt 108"). The NL prompt 108 may be a natural language description of what information the user desires and may include uncommon terms (e.g., acronyms, product names, organization specific terms, colloquial terms, etc.) that may not be well understood to outsiders. However, the NL prompt 108 may be associated with (e.g., mapped to, etc.) the secure data repository 106, which may enable providing contextual information for association with the NL prompt 108. For example, the NL prompt 108 may be directed for fulfillment using the secure data repository 106 and not to be fulfilled by other types of data (e.g., the Internet generally, etc.). However, in some embodiments, other data sources may supplement data from the secure data repository 106. In various embodiments, the secure data repository 106 may be made generally available to many users and may be referred to as a data repository, such as in an implementation that stores public data.

The user may be associated with a role 109. The role 109 may be an activity or responsibility of the user, possibly at an organization. The role 109 may be designated by the user, an organization, or by other people or processes. Example roles may be finance, marketing, engineering, legal, artist, teacher, manager, director, etc. However, other types of roles may be used, such as creator, reviewer, approver, scheduler, and so forth. The role 109 may indicate a type of data that is requested by the user in the NL prompt 108 as well as mechanisms to provide responsive output data to that user with configurable interactive components based at least in part on the role 109 of the user 102.

The user 102 may be associated with credentials 110, which may be associated with permissions for the user 102. For example, the credentials 110 may enable the user to access certain information from the secure data repository 106 that some other users or people may not be privileged to access. However, some credentials may not allow access to all of the data in the secure data repository 106 depending on a role of the user 102. Thus, a high level employee may have access to more information in the secure data repository 106 via her credentials as compared to a lower level employee, for example. Different sets or groupings of data in the secure data repository 106 may require different levels of permissions, which may be associated with the credentials 110.

The user device 104 may send the NL prompt 108, and possibly the role 109 and the credentials 110, to a data acquisition server 112 via one or more network(s) 114. In some embodiments, the role 109 and/or the credentials 110 may be stored by the data acquisition server 112 and associated with the user 102, possibly with regard to the NL prompt 108. The one or more network(s) 114 may include wired or wireless networks configured to exchange information between the various devices included in the environment 100. The one or more network(s) 114 may include local area networks, wide area networks, mobile networks, peer-to-peer networks, the Internet, and/or other types of networks that facilitate an exchange of data as discussed with respect to the environment 100.

The data acquisition server 112 may send the NL prompt 108 and possibly the role 109 to one or more LLMs 116. The one or more LLMs 116 may be used to perform certain functions for the data acquisition server 112, such as process a natural language request and provide structured data as an output. The one or more LLMs 116 may process the NL prompt 108, possibly in view of the role 109, and output a query 118, such as a structured graph query, which may be sent to the data acquisition server 112 and used to extract data from the secure data repository 106.

The data acquisition server 112 may send, via an application program interface (API) 120, the structured graph query for fulfillment using data from the secure data repository 106. The data acquisition server 112 may send the credentials 110 with the API 120 or may modify the query 118 based on the credentials 110 to enforce a security policy controlling access to data in the secure data repository 106. The data stored in the secure data repository 106 may include a graph structure 122. The graph structure 122 may be mapped to a unified graph schema to enable access to the data, which may be heterogeneous data stored in various different data repositories. The graph structure 112 may include vertices that represent entities like titles, people, etc., while edges may show relationships between vertices (e.g., entities). A schema may be enhanced with semantic labels from a knowledge graph, which may assist language models to implement schema elements.

The data acquisition server 112 may access relevant data 123 in response to execution of the structured graph query, such as via the API 120. The relevant data 123 may be associated with the NL prompt 108, possibly in view of the role 109, and may provide information to enable creation of an answer or other response to the NL prompt 108. The data acquisition server 112 may send the relevant data 123 to the one or more LLMs 116, possibly with the NL prompt 108 and/or the role 109. The one or more LLMs 116 may process the NL prompt 108 to create a response or answer to the NL prompt 108 based at least in part on the relevant data 123. In some embodiments, a different LLM may be used to create the response 124 than an LLM used to create the query 118. For example, a first LLM of the LLMs 116 may be tuned to create the query 118 while a second LLM of the LLMs 116 may be tuned to create the response 124.

The data acquisition server 112 may receive the response 124 and may send the response to an interactive component library 125 to obtain an interactive component 126 for use with the response 124. In some embodiments, the interactive component library 125 may be queried or otherwise accessed to obtain the interactive component 126. The interactive component 126 may be a configurable interactive component used to format the response, enable the user to interact with the response (e.g., play or edit media, organize data, etc.), take actions (e.g., send a message, approve an action, schedule a meeting, etc.), or perform actions on behalf of the user. In some embodiments, the response 124 may indicate the interactive component 126 to be selected from the interactive component library 125. For example, the LLMs 116 may provide an indication of the interactive component 126 to be selected based on the NL prompt 108, the role 109, the relevant data 123, and/or other information.

The data acquisition server 112 may provide the response 124 and the interactive component to the user 102 via the user device 104. The response 124 may be provided by the interactive component 126 (possibly as a UI) and/or with the interactive component 126 (e.g., as components and/or commands in a UI). In some instances, multiple interactive components may be provided with the response, such as an interactive component that provides a user interface 128, an interactive component that creates an actionable command (e.g., send an electronic communication, approve a request, etc.), and/or other interactive components associated with portions of the response.

The response 124 may include proprietary information that is only accessible to users with certain credentials, such as the user 102 with the credentials 110. By leveraging the graph structure 122, the relevant data 123 may be readily accessed and processed by the data acquisition server 112 and/or the one or more LLMs 116. Meanwhile, restricted data stored in the secure data repository is made unavailable to unauthorized persons and/or other users of the one or more LLMs 116 that do not have credentials that enable access to such restricted data.

Figure 3A:
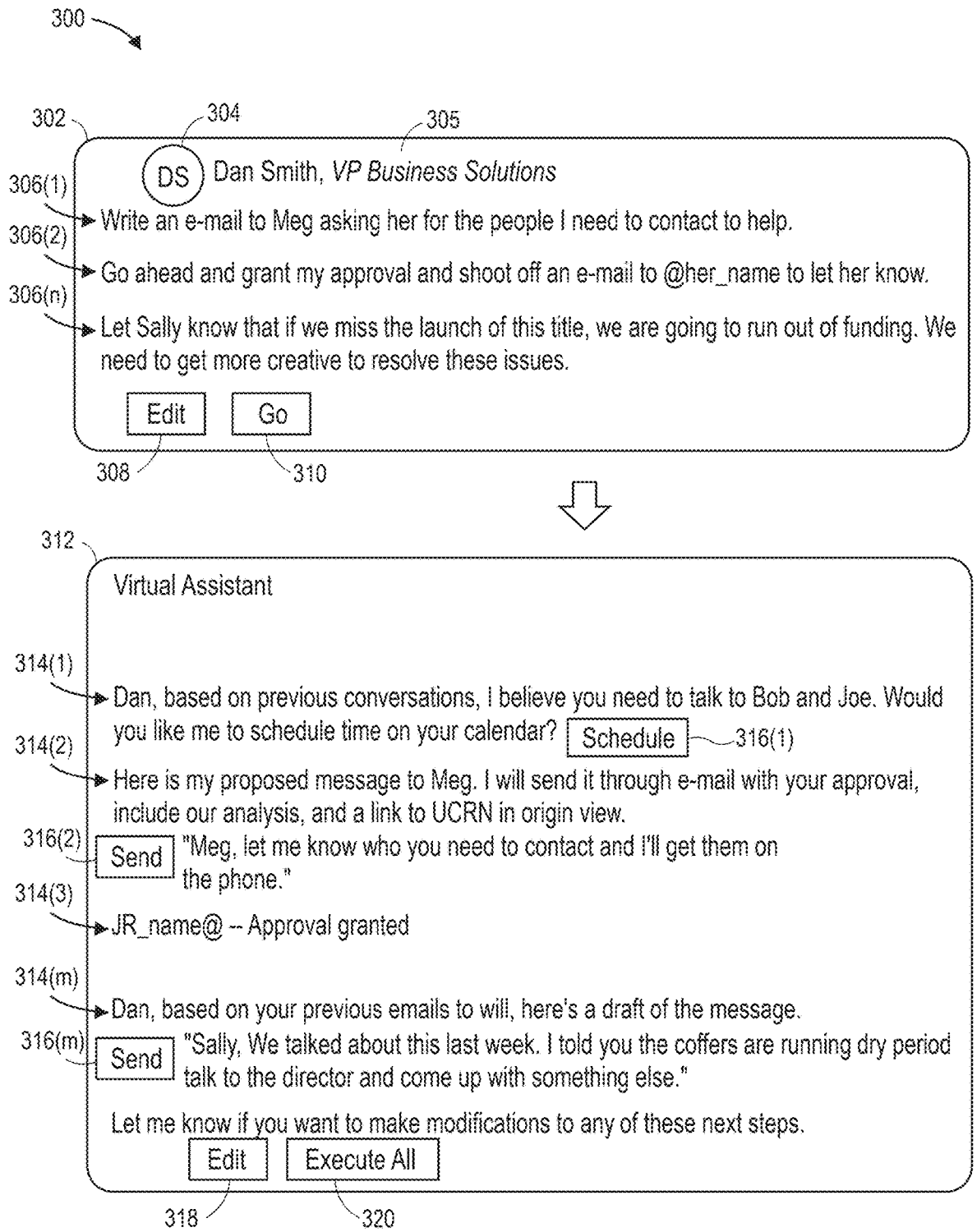
FIGS. 3A-3C are schematic diagrams of various request/response exchanges that provide outputs with configurable interactive components, according to various implementations.
Figure 3B:
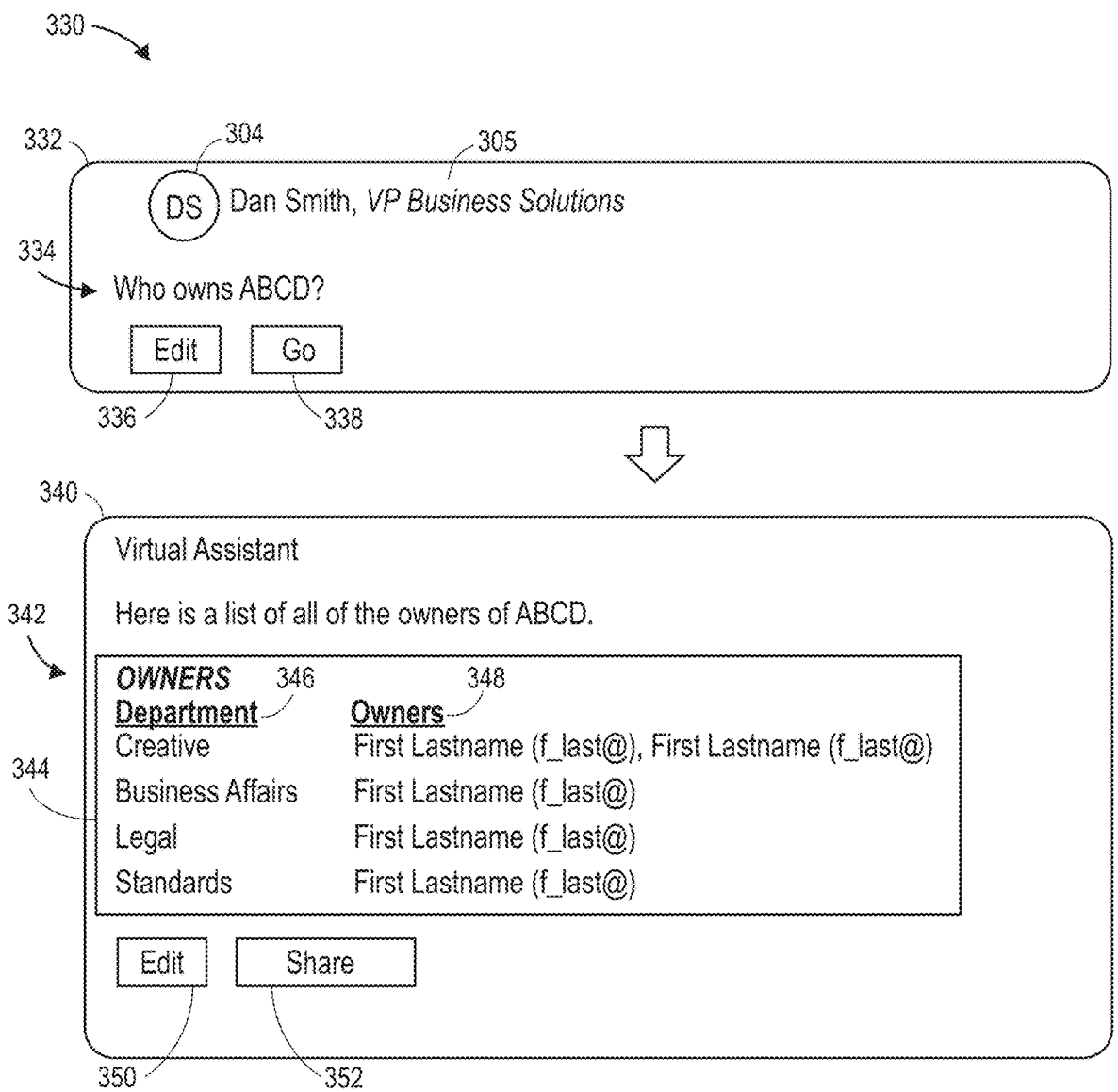
Figure 3C:
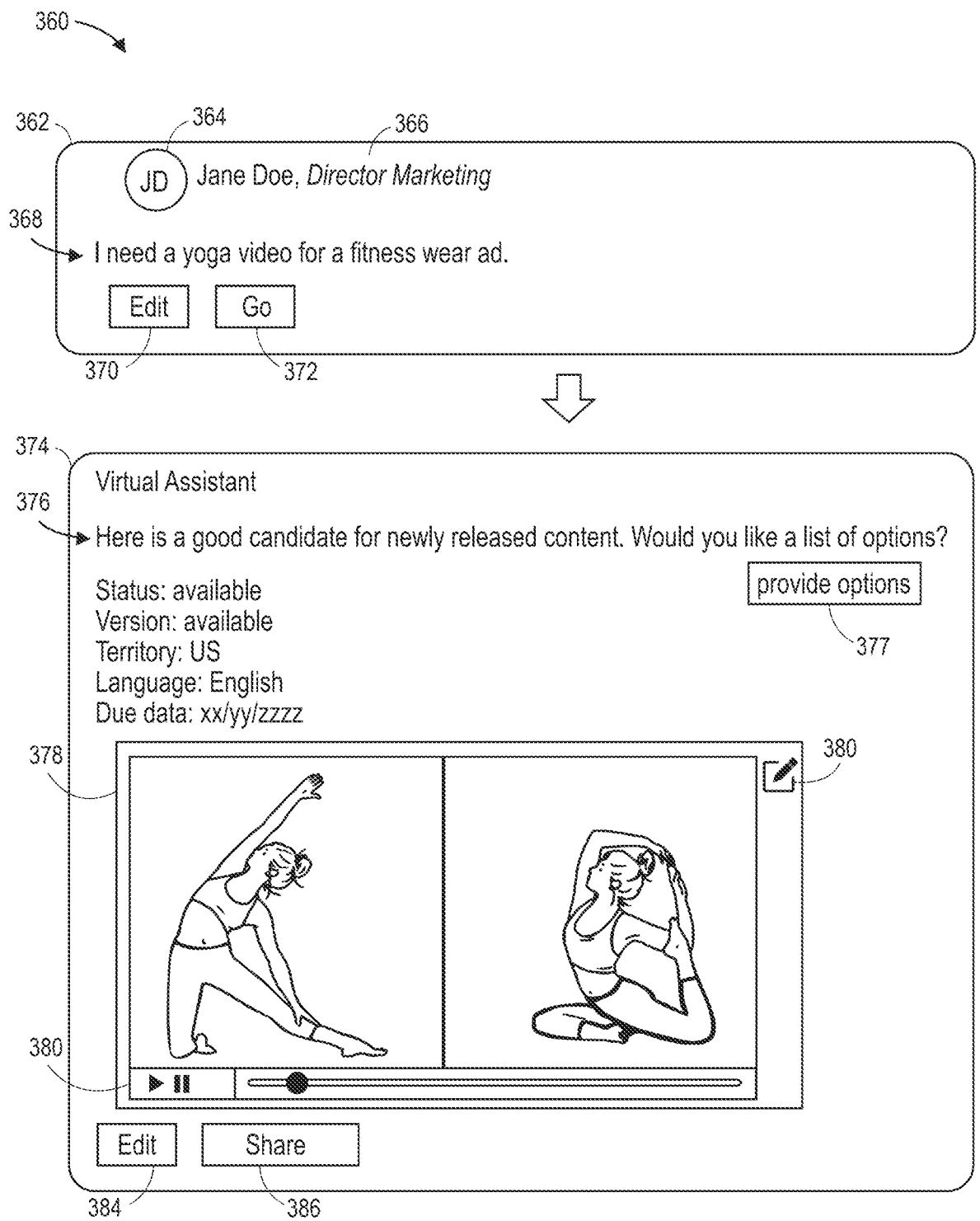
Figure 4:
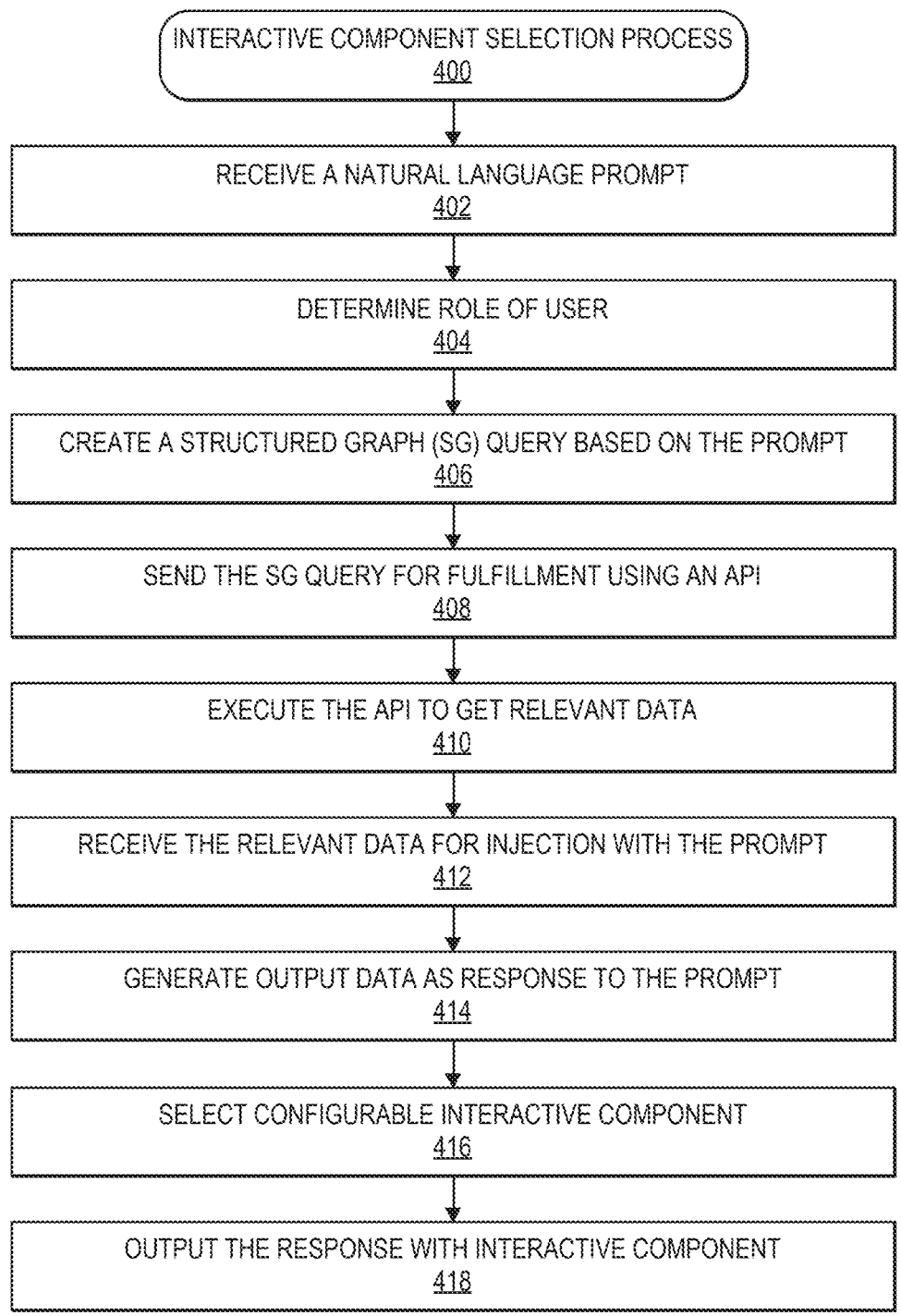
FIG. 4 is a flow diagram of an example process for responding to a request with a configurable interactive component that provides output data, according to an implementation.
Figure 5:
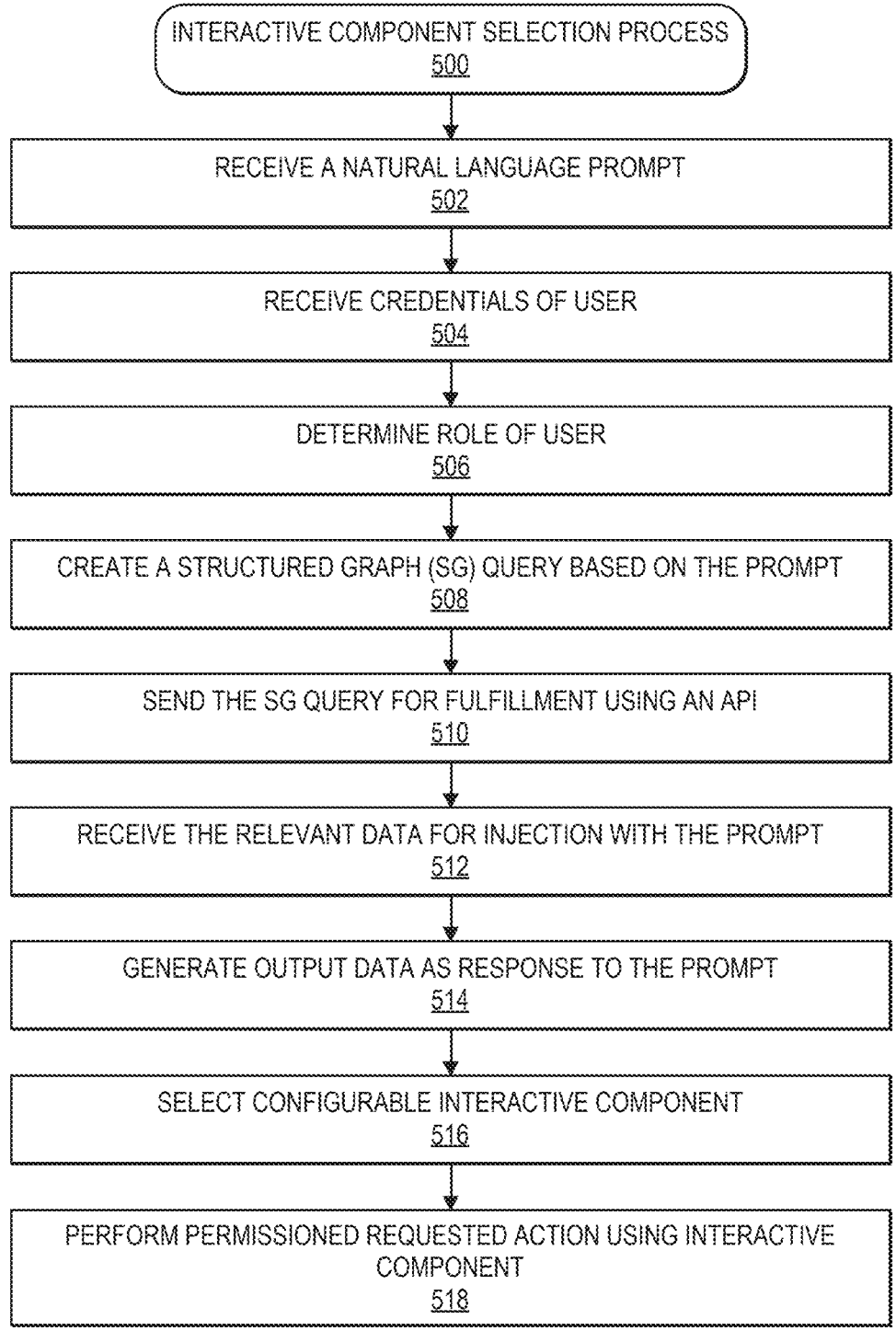
FIG. 5 is a flow diagram of an example process for responding to a request with a configurable interactive component that performs permissioned actions on behalf of a user, in accordance with disclosed implementations.
Figure 6:
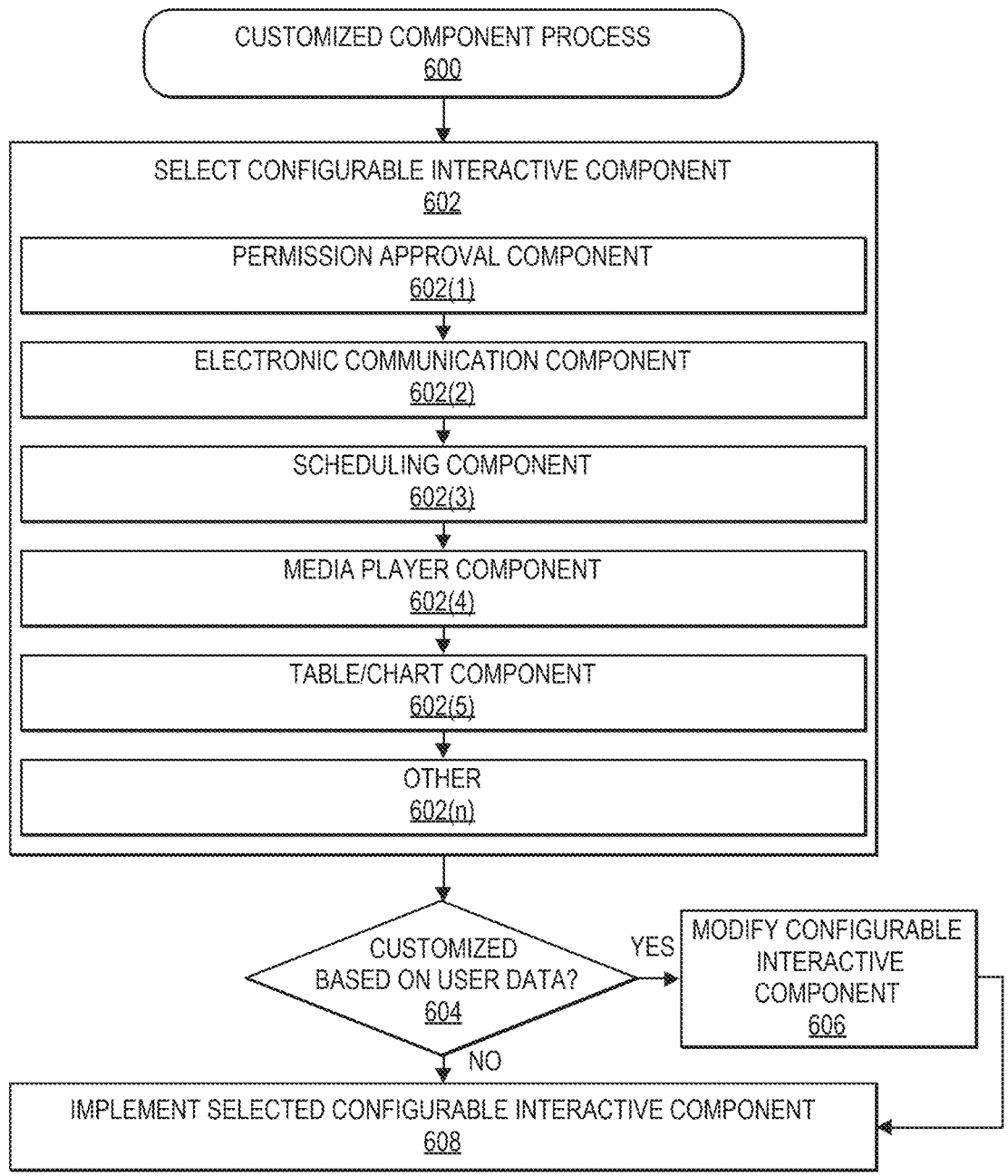
FIG. 6 is a flow diagram of an example process for selecting and optionally modifying a configurable interactive component based on user input, according to an implementation.

The data processing and output of relevant data and configurable interactive components described above with reference to the environment 100 and FIG. 1 is exemplary and may include other modifications. Some data may be processed or transmitted without the data acquisition server 112 performing an action. For example, the API 120 may provide the relevant data 123 directly to the one or more LLMs 116. Other modifications may be made to the data processing described and/or the components and devices described regarding FIG. 1 while maintaining the spirit and scope of the disclosure. Further details regarding selection of the configurable interactive components are described in FIG. 2. FIGS. 3A-3C show some example configurable interactive components while FIGS. 4-6 provide additional processes to create meaningful responses (or answers) to NL prompts with configurable interactive components using data extracted from the secure data repository 106.

Figure 2:
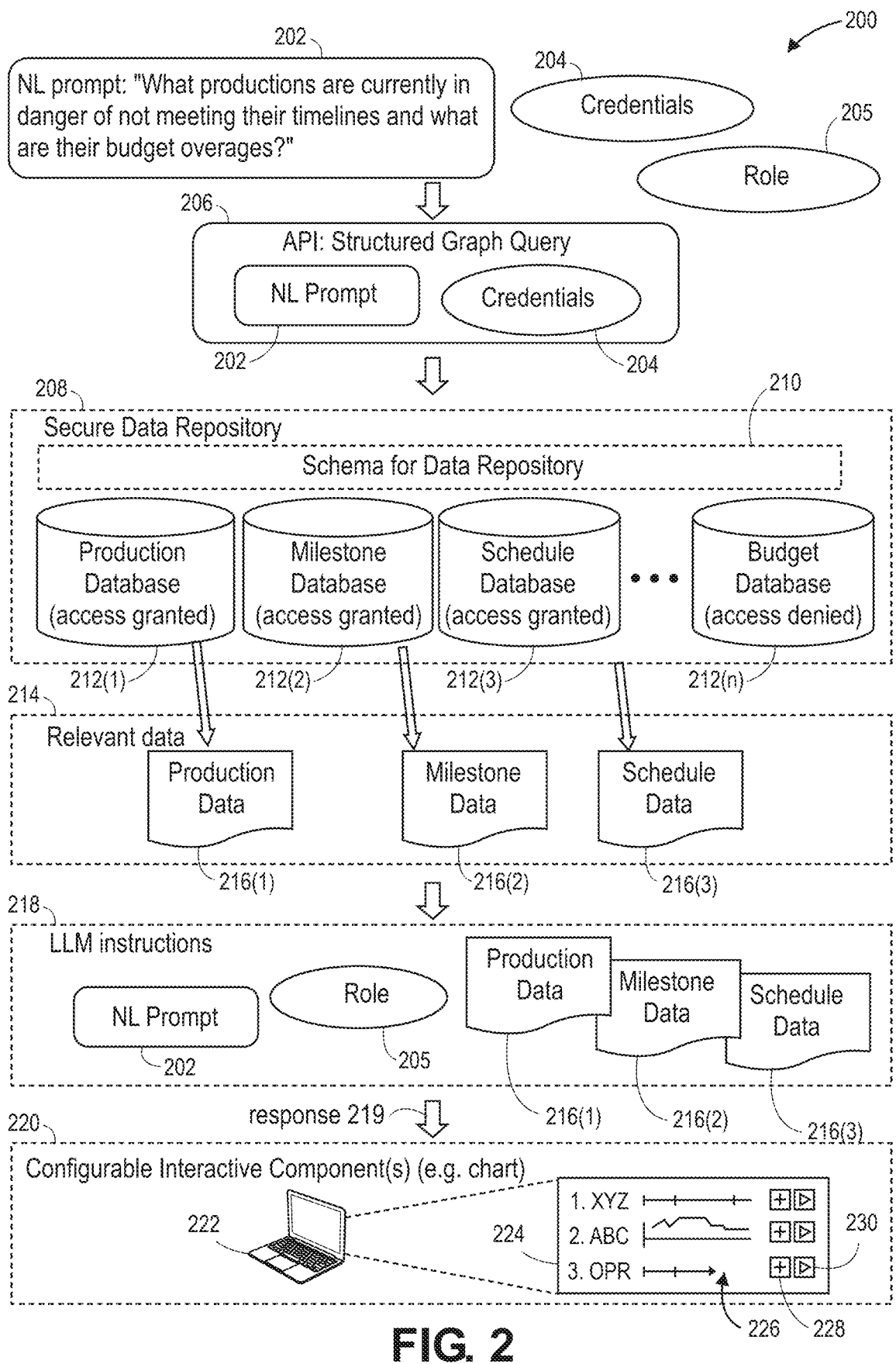
FIG. 2 is a schematic diagram showing illustrative data transformations to refine a natural language prompt with contextual data and provide configurable interactive components for output of data, according to an implementation.

FIG. 2 is a schematic diagram showing illustrative data transformations 200 to refine an NL prompt with contextual data and provide configurable interactive components for output of data, according to an implementation. The data flow 200 may include input of an NL prompt 202, which may be similar to the NL prompt 108 discussed above with reference to FIG. 1. The NL prompt 202 may state, for example, "What productions are currently in danger of not meeting their timelines and what are their budget overages?", as input by a user. The data flow 200 may also include credentials 204 for a user and a role 205, which may be similar to the credentials 110 and the role 109, respectively, discussed with reference to FIG. 1. The credentials 204 may be associated with user permissions to access certain data in the secure data repository 106. The role 205 may be an activity or responsibility of the user, possibly at an organization. The role 205 may be designated by the user, an organization, or by other people or processes. The role 205 may indicate a type of data that is requested by the user in the NL prompt 202 as well as mechanisms to provide responsive output data to that user with configurable interactive components.

The NL prompt 202 and the credentials 204 may be included in an API structured graph query 206. The role 205 may be used to create the API structured graph query 206 but may not be explicitly included in the API structured graph query 206. However, the role 205 may be included in the API structured graph query 206 in some embodiments. The API structured graph query 206 may be created by an LLM using at least portions of the NL prompt 202 and may include the credentials 204. In some embodiments, the credentials 204 may be verified prior to submission of the API structured graph query 206, and thus may not be included in the actual API structured graph query 206. The API structured graph query 206 may include a structured graph query that is submitted for fulfillment via a secure data repository by an API.

The API structured graph query 206 may query a secure data repository 208, which may be similar to the secure data repository 106 described with reference to FIG. 1. The API structured graph query 206 may be written or coded to point to the secure data repository 208 based on the user that submits the NL prompt 202 or for other reasons such that the NL prompt 202 includes a designation of a data source to query, etc. The secure data repository 208 may include a schema for the data repository 210 (or "schema 210"). The schema 210 may be a unified graph schema representing underlying federated graphs of data stored in heterogeneous systems, referred to as the secure data repository 208. For purposes of this example, data included in the secure data repository 208 may include a production database 212(1), a milestone database 212(2), a schedule database 212(3), and a budget database 212(n). However, the secure data repository 208 may store more data and data of different types. Some of the data sources in the secure data repository 208 may be associated with permissions, which may require certain credentials, such as the credentials 204, to enable access to the respective data. In the example provided in FIG. 2, the following data is authorized for the credentials 204: the production database 212(1), the milestone database 212(2), and the schedule database 212(3), while the following data is restricted from this user based on their credentials 204: the budget database 212(n). In some instances, all data may be authorized or restricted. When some data is restricted, that restricted data may not be available to provide to the LLM to create a response to the NL prompt 202. However, the LLM may still respond to the NL prompt 202 without some data that is restricted. In some embodiments, the LLM may indicate that some data is restricted and/or otherwise inform the user as to why some of the NL prompt 202 is not answered or otherwise fulfilled.

The API structured graph query 206 may ultimately extract relevant data 214 from the secure data repository where access is granted based on the credentials 204. The relevant data 214 may be a subset of the respective databases, such as specific data or portions of data requested by a query (e.g., certain fields of data, data types, ranges of data, etc.). The relevant data 214 in this example may include production data 216(1), milestone data 216(2), and schedule data 216(3), among other possible data that can be returned in response to the API structured graph query 206 from the secure data repository 208.

The relevant data 214 may be injected or otherwise provided to the LLM or another LLM as LLM instructions 218, along with the role 205. The LLM instructions 218 may include the NL prompt 202, the role 205, and the relevant data 214, such as the production data 216(1), the milestone data 216(2), and the schedule data 216(3), among other possible data. In some embodiments, the LLM instructions 218 may include a refined NL prompt. Ultimately, the LLM instructions may be used to create a response 219 to the NL prompt 202.

The response 219 may be used to select the configurable interactive component(s) 220 or may specify the configurable interactive component(s) 220. In some embodiments, the data acquisition server 112 may retrieve the configurable interactive component(s) 220 based on the response 219, the role 205, and possibly other data. In various embodiments, an LLM may determine the configurable interactive component(s) 220 for use with the response 219, such as in response to the LLM instructions 218.

The configurable interactive component(s) 220 may be made accessible by a user device 222. In some embodiments, the configurable interactive component(s) 220 may include a user interface (UI) 224, which may provide a format for the response 219 suitable for the user based on the role 205. The configurable interactive component(s) 220 may include a chart 226 or table to provide user interaction with at least some of the data in the response 219. The configurable interactive component(s) 220 may include one or more edit controls 228 to edit at least a portion of the response 219. The configurable interactive component(s) 220 may include one or more action controls 230 to cause performance of actions with at least a portion of the response 219, such as to play content, edit content, share content, approve content, or perform other actions discussed with reference to at least FIGS. 4-6 below. In addition, the configurable interactive component(s) 220 may include any features discussed with reference to FIGS. 3A-3C below.

FIGS. 3A-3C are schematic diagrams of various request/response exchanges that provide outputs with configurable interactive components, according to various implementations. Turning to FIG. 3A, a first sample exchange 300 may include an NL prompt component 302 shown as an example NL prompt from a user 304. The user 304 may include a role 305. The NL prompt may include requests 306(1), 306(2), and 306(n). However, any number of requests may be included in the NL prompt. The NL prompt component 302 may include an edit command 308 to edit the NL prompt and/or a go command 310 to execute the NL prompt and return a response or possibly multiple responses. In some embodiments, the NL prompt may be provided via audio, which may be converted to text and provided in the NL prompt component 302. However, the NL prompt component 302 is not necessary for submission of the NL prompt and the processing of the NL prompt.

In response to the submission of the NL prompt, possibly via selection of the go command 310, the system may return one or more responses that include configurable interactive components in a UI 312. The UI 312 may be a configurable interactive component that provides a format for the results as well as controls to enable the user 304 to take one or more actions. The UI 312 may be selected based on the role 305 of the user 304.

The UI 312 may include various response data 314(1)-314(m), some of which may be presented with a corresponding configurable interactive component. First response data 314(1) may include information from a prior NL prompt to remind the user 304 about a task and prompt the user 304 for an action via a first configurable interactive component 316(1) that may enable the user to take the proposed action in the first response data 314(1), such as schedule a proposed meeting that is indicated in the first response data 314(1). The first configurable interactive component 316(1) may be embedded with information (e.g., code) necessary to perform the specified action.

Second response data 314(2) may include information responsive to the second request 306(2) of the NL prompt, which may include a proposed communication to a person mentioned in the request. A second configurable interactive component 316(2) may be included that may enable the user 304 to take the proposed action in the second response data 314(2), such as send an electronic message to a person mentioned in the second request 306(2). The second configurable interactive component 316(2) may include an electronic address for the person mentioned in the second request 306(2). For example, during implementation of the second configurable interactive component 316(2), relevant data may be populated in corresponding fields or as needed to perform a requested action, such as to obtain a message body and address to send the message as provided in this example.

Third response data 314(3) may include an approval notification and may indicate an action taken on behalf of the user 304. The action, "approval," may be performed by a configurable interactive component on behalf of the user and without further user actions, possibly by using the user's credentials and/or role to grant the approval or otherwise take the requested action. For example, during implementation of this configurable interactive component, credentials may be accessed for the user and an approval may be recorded in a system, such as in the secure data repository shown in FIG. 1. The configurable interactive component may provide instructions to the data acquisition server 112 to perform these actions or may otherwise implement the actions using software instructions that may be included in the configurable interactive component.

Last response data 314(m) may include information responsive to the request 306(n) of the NL prompt, which may include a proposed communication to a person mentioned in the request. The last response data 314(m) may include a last configurable interactive component 316(m) that may enable the user to take the proposed action in the last response data 314(m), such as sending an electronic communication.

The UI 312 may include other interactive content, which may be part of a configurable interactive component that forms the UI 312. The other interactive content may include a message, an edit command 318 to enable the user to edit information in the UI 312, and a execute all command 320 to enable the user to take all the proposed actions included in the UI 312, such as to implement the actions in the configurable interactive components 316(1)-(m), for example.

Turning to FIG. 3B, a second sample exchange 330 may include an NL prompt component 332 that shows an example NL prompt from the user 304 that includes the role 305. The NL prompt may include a request 334, such as a request of "Who owns ABCD?". However, any number of requests may be included in the NL prompt. The NL prompt component 332 may include an edit command 336 to edit the NL prompt and/or a go command 338 to execute the NL prompt and return a response or possibly multiple responses.

In some embodiments, the NL prompt may be provided via audio, which may be converted to text and provided in the NL prompt component 332. However, the NL prompt component 332 is not necessary for submission of the NL prompt and the processing of the NL prompt.

In response to the submission of the NL prompt, possibly via selection of the go command 338, the system may return one or more responses that include configurable interactive components in a UI 340. The UI 340 may be a configurable interactive component that provides a format for the results as well as controls to enable the user 304 to take one or more actions. The UI 340 may be selected based on the role 305 of the user 304.

The UI 340 may include response data 342, some of which may be presented with a corresponding configurable interactive component. For example, the response data 342 may include a message "Here is a list of all the owners of ABCD" and may include a configurable interactive component 344 that organizes the owners in an interactive table format that allows the user 304 to sort, extract additional details possibly with links to other data, edit, or otherwise interact with the data in the configurable interactive component 344. The table may include a first field 346 and a second field 348, which may be selected based on the NL prompt, the role 305 of the user 304, the data to be presented, and/or based on default settings for the configurable interactive component 344 (e.g., show primary fields of data, etc.).

The UI 340 may include other interactive content, which may be part of a configurable interactive component that forms the UI 340. The other interactive content may include an edit command 350 to enable the user to edit information in the UI 340, and a share command 352 to enable the user to share the response or the configurable interactive component 344 with another user, another device, and so forth. Other commands may be provided by the configurable interactive component to enable the user 304 to perform other actions with the response, possibly based on the role 305 of the user 304, credentials of the user (e.g., to permission edits to data, make approvals, etc.), and so forth.

Turning to FIG. 3C, a third sample exchange 360 may include an NL prompt component 362 that shows an example NL prompt from a user 364 that includes the role 366. The NL prompt may include a request 368, such as a request of "I need a yoga video for a fitness wear ad." However, any number of requests may be included in the NL prompt. The NL prompt component 362 may include an edit command 370 to edit the NL prompt and/or a go command 372 to execute the NL prompt and return a response or possibly multiple responses. In some embodiments, the NL prompt may be provided via audio, which may be converted to text and provided in the NL prompt component 362. However, the NL prompt component 362 is not necessary for submission of the NL prompt and the processing of the NL prompt.

In response to the submission of the NL prompt, possibly via selection of the go command 372, the system may return one or more responses that include configurable interactive components in a UI 374. The UI 374 may be a configurable interactive component that provides a format for the results as well as controls to enable the user 364 to take one or more actions. The UI 374 may be selected based on the role 366 of the user 364.

The UI 374 may include response data 376, some of which may be presented with a corresponding configurable interactive component. For example, the response data 376 may include a message "Here is a good candidate for newly released content. Would you like a list of options?" and the UI 374 may include a first configurable interactive component 377 to provide the proffered "options." For example, the first configurable interactive component 377 may include a link to additional media, options to modify the media, and/or other data resources relevant to the request and possibly based on the user 364, the role 366 of the user 364, credentials of the user 364, and/or other data.

The UI 374 may include a second configurable interactive component 378 that provides a media player to provide playback or interaction with media returned as part of the response to the NL prompt. The second configurable interactive component 378 may include tools 380 that are selected based on the role 366 of the user 364 to enable the user 364 take certain actions, such as edit or annotate the media, select a portion of the media, and/or interact with the media in other ways.

The UI 374 may include other interactive content, which may be part of a configurable interactive component that forms the UI 374. The other interactive content may include an edit command 384 to enable the user to edit information in the UI 374, and a share command 386 to enable the user to share the response or the second configurable interactive component 378 with another user, another device, and so forth. Other commands may be provided by the configurable interactive component to enable the user 364 to perform other actions with the response, possibly based on the role 366 of the user 364, credentials of the user (e.g., to permission edits to data, make approvals, etc.), and so forth.

Additional configurable interactive components may be deployed for use in the described systems and methods. Additional examples follow.

A Document Review Component to allow users to review, annotate, and approve documents. The component may include version tracking and change highlighting features. This component may be particularly useful for legal, publishing, or collaborative writing workflows.

A Project Management Component to display project timelines, tasks, and resource allocation. The component may allow updating of project status and assignment of tasks. This component integrates with scheduling and communication components for comprehensive project oversight.

A Data Visualization Component to create interactive charts, graphs, and data visualizations. The component may allow users to drill down into data points for more detail. This component is especially useful for financial analysis, marketing, or business intelligence applications.

A Workflow Automation Component to visually represent business processes and workflows. The component may allow users to trigger or advance workflow steps and tracks progress. This component also notifies relevant parties of needed actions, streamlining complex processes.

An Asset Management Component to catalog and display digital assets such as images, videos, and documents. The component may include tagging, searching, and rights management features. This component is particularly useful for media, marketing, or design workflows.

A Customer Relationship Management (CRM) Component to display customer information, interaction history, and sales pipeline data. The component may allow updating of customer records and logging of interactions. This component integrates with communication and scheduling components for comprehensive customer management.

An Inventory Management Component to show real-time inventory levels and locations. The component may allow for stock updates, reordering, and transfer between locations. This component is especially useful for retail, manufacturing, or logistics businesses.

A Financial Reporting Component to display key financial metrics and generate reports. The component may allow for budget adjustments and financial forecasting. This component includes compliance and audit trail features for accurate and transparent financial management.

A Learning Management Component to present training materials and track employee progress. The component may include quiz/assessment features and certification tracking. This component is useful for onboarding, compliance training, or skill development initiatives.

A Quality Assurance Component to display quality metrics and test results. The component may allow for logging of issues and tracking of resolutions. This component is particularly useful for manufacturing, software development, or service industries.

A Social Media Management Component to display social media analytics and scheduled posts. The component may allow for content creation, approval, and publishing across platforms. This component is especially useful for marketing and communications teams.

A Compliance Tracking Component to show regulatory requirements and compliance status. The component may allow for documentation of compliance activities and generation of reports. This component is particularly useful for highly regulated industries like finance or healthcare.

A Supply Chain Management Component to visualize the entire supply chain from suppliers to end customers. The component may allow for real-time tracking of shipments and inventory levels. This component includes features for demand forecasting and supplier performance tracking.

A Human Resources Dashboard Component to display employee information, performance metrics, and team structures. The component may include tools for performance reviews, time-off management, and recruitment tracking. This component integrates with scheduling and communication components for comprehensive HR management.

A Risk Assessment Component to present risk matrices and mitigation strategies. The component may allow for updating of risk factors and tracking of mitigation efforts. This component is useful for project management, financial planning, or compliance workflows.

A Budgeting and Forecasting Component to provide interactive budget planning and "what-if" scenario modeling. The component may allow for collaborative input from different departments. This component includes historical data comparison and variance analysis features for comprehensive financial planning.

A Product Development Lifecycle Component to visualize stages of product development from concept to launch. The component may allow for task assignment, progress tracking, and milestone management. This component integrates with project management and quality assurance components for seamless product development.

A Customer Feedback Analysis Component to aggregate and analyze customer feedback from various sources. The component may provide sentiment analysis and trend identification. This component allows for categorization and assignment of action items based on feedback for improved customer satisfaction.

A Sustainability Tracking Component to monitor and display sustainability metrics such as carbon footprint and waste reduction. The component may allow for setting and tracking of sustainability goals. This component generates reports for internal and external stakeholders to support corporate sustainability initiatives.

A Market Intelligence Component to aggregate and present market trends, competitor analysis, and industry news. The component may allow for collaborative annotation and discussion of market insights. This component integrates with strategy planning and product development components for informed decision-making.

A Legal Case Management Component to track legal cases, contracts, and intellectual property. The component may allow for document management, deadline tracking, and billing integration. This component is particularly useful for legal departments or law firms.

An Employee Engagement Component to facilitate employee surveys, feedback collection, and idea submission. The component may display engagement metrics and trends over time. This component allows for action planning and tracking based on employee feedback to improve workplace satisfaction.

A Facilities Management Component to visualize office layouts and resource allocation. The component may allow for booking of meeting rooms and managing of office equipment. This component tracks maintenance schedules and manages service requests for efficient facility operations.

An IT Service Management Component to display IT infrastructure health and service ticket status. The component may allow for incident logging, prioritization, and resolution tracking. This component includes features for change management and service level agreement tracking for effective IT operations.

A Sales Pipeline Management Component to visualize sales funnel and opportunity tracking. The component may allow for updating deal status and sales forecasting. This component integrates with CRM and financial reporting components for comprehensive sales management.

A Script Development Component to allow writers to draft, revise, and collaborate on scripts. The component may include versioning, commenting, and annotation features. This component integrates with project management tools to track script progress through various stages of development.

A Storyboard Visualization Component to enable artists to create, organize, and share digital storyboards. The component may allow for easy reordering of scenes and addition of notes. This component can sync with script revisions to ensure alignment between written and visual storytelling.

A Casting Management Component to track actor auditions, callbacks, and final selections. The component may store headshots, resumes, and audition videos. This component integrates with scheduling tools to manage actor availability and shooting schedules.

A Location Scouting Component to catalog potential filming locations with photos, videos, and key information. The component may allow for collaborative decision-making and tracking of location permits. This component can integrate with budgeting tools to factor in location costs.

A Costume and Prop Inventory Component to manage the studio's collection of costumes and props. The component may track item locations, condition, and usage history. This component can generate reports for budgeting and help identify needs for upcoming productions.

A Post-Production Workflow Component to visualize the editing process from raw footage to final cut. The component may allow for task assignment to editors, sound designers, and visual effects artists. This component tracks revisions and approvals throughout the post-production phase.

A Music and Sound Library Component to catalog and organize the studio's collection of music and sound effects. The component may include advanced search features and licensing information. This component integrates with editing software for seamless audio integration.

A Visual Effects Planning Component to allow for pre-visualization of complex visual effects shots. The component may track the progress of VFX work from concept to final render. This component integrates with budgeting tools to manage VFX costs.

A Talent Management Component to track contracts, payments, and schedules for actors, directors, and other key talent. The component may manage talent availability and conflicts. This component integrates with legal and finance systems for comprehensive talent management.

A Content Distribution Component to manage the release of content across various platforms and markets. The component may track licensing agreements and revenue streams. This component provides analytics on content performance across different distribution channels.

A Marketing Asset Creator Component to facilitate the creation and approval of marketing materials like posters, trailers, and social media content. The component may allow for collaborative feedback and version control. This component integrates with the asset management system for organized storage and retrieval.

A Budget Tracking Component to provide real-time monitoring of production expenses. The component may allow for easy comparison of actual vs. budgeted costs. This component can generate alerts for potential cost overruns and integrate with the studio's financial systems.

A Equipment Rental and Management Component to track the studio's equipment inventory and rental needs. The component may manage equipment maintenance schedules and tracks usage history. This component can help optimize equipment utilization across multiple productions.

An Audience Testing Component to manage test screenings and audience feedback collection. The component may provide tools for analyzing audience reactions and suggestions. This component can help inform final editing decisions and marketing strategies.

A Content Localization Component to manage the translation and adaptation of content for different markets. The component may track the progress of dubbing, subtitling, and cultural adaptations. This component integrates with the distribution system to ensure appropriate versions are available for each market.

A System Administration Component to manage a user's profile or other system settings. The component may include toggles and switches, and can help the user navigate their profile and configuration to affect the way the system interacts and displays.

Of course, other configurable interactive components may be used with the disclosed systems and methods.

FIG. 4 is a flow diagram of an example process 400 for responding to a request with a configurable interactive component that provides output data, according to an implementation. The example process of FIG. 4 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 400 may begin by receiving a natural language prompt from a user, as in 402. The user may be associated with an entity that includes proprietary data accessible by the user via the natural language prompt. The prompt may be received as text or in other ways, such as audio that is converted to text by a speech-to-text algorithm.

A role of the user may be determined, as in 404. The role may be an organizational role or another role of the user. The role may be designated by the user, by an organization, and/or by other users. The role may indicate a type of work or function of the user.

A structured graph query may be created based on the natural language prompt, as in 406. The structured graph query may be created by an LLM that processes the natural language prompt to create the structured graph query. The structured graph query may be formatted using a graph query language to augment the natural language prompt and return meaningful data for further processing of the prompt by the LLM.

The structured graph query may be sent for fulfillment using an API, as in 408. The API may make a call to a secure data repository that includes the proprietary data desired by the user. The secure data repository may include a graph query language schema with knowledge graph semantic labels for heterogeneous data included in the secure data repository.

The API may be executed to obtain data that is relevant to the prompt as relevant data, as in 410. The API may execute queries over federated graphs in standard graph query language to augment context of prompts and return meaningful data for further processing of the prompt by the LLM. The API may return the relevant data to the LLM or to a data acquisition server that passes the relevant data to the LLM. The relevant data may include data from different data repositories, databases, etc. and may include data in different formats, different data types, and so forth. In some embodiments, user credentials may be verified before at least some data is made available for access by the user or the LLM.

The relevant data may be received for injection with the natural language prompt, as in 412. For example, the relevant data and the prompt may be injected into instructions for an LLM to process the natural language prompt and create a response to the natural language prompt based at least in part on the relevant data. The relevant data may be a subset of data from a particular data source, which may be optimized to provide the LLM with at least some essential data and minimize or reduce extraneous data that may not be relevant to the natural language prompt.

The LLM may generate output data as a response to the natural language prompt, as in 414. For example, the LLM may process the natural language prompt to extract and structure certain data included in the relevant data based on the natural language prompt and possibly the role of the user to create a meaningful response. The LLM may utilize information other than the relevant data, such as public data or other data repositories available to the LLM (e.g., the Internet, etc.). However, the LLM may not have access to the relevant data from the secure data repository to respond to prompts from other users that are not associated with the same entity or privileges as the user that submitted the natural language query at the operation 402.

A configurable interactive component may be selected to provide the output data to the user, as in 416. For example, the configurable interactive component may be selected based on the NL prompt, the role of the user, and/or the relevant data. The configurable interactive component may be selected from a library of configurable interactive components. In some embodiments, the configurable interactive component may be populated with information, such as parts of the output data. In various embodiments, the configurable interactive component may include software code to perform certain actions in response to a user action (e.g., selection of a command, etc.) or on behalf of the user such as responsive to the NL prompt (e.g., authorize a request, etc.). In various embodiments, multiple configurable interactive components may be selected for use with the output data such as when one of the configurable interactive component is a UI to format the data and another configurable interactive component is configured to perform an action.

The configurable interactive component may be provided to the user with the output data, as in 418. For example, the configurable interactive component and the output data may be sent to a user device associated with the user. In some embodiments, the configurable interactive component and the output data may be accessed by the user device, such as via a network and a browser while the configurable interactive component and/or the output data reside on a device that is separate from the user's device, such as a server.

In some embodiments, the process 400 may include a request generated based on prior data, possibly instead of a request from a user. For example, a system may prompt a user to complete a pending task, such as respond to an outstanding email, complete an overdue assignment, or perform other tasks tracked by the system and possibly stored in the secure data repository. The process may use the prior data to perform a query and provide a configurable interactive component based at least in part on the role of the user and the prior data to enable the user to complete the task or perform another operation.

A sample implementation of the process 400 may include the following operations. A natural language prompt may be received from a user and by one or more LLM. An organizational role associated with the user may be determined for the user. One or more LLM may create a structured graph query based on at least one word in the prompt. The structured graph query may extract relevant data from a data repository. The structured graph query may be sent for fulfillment using an API. The relevant data may be received by the API and in response to the structured graph query. The relevant data may be for inclusion with the prompt and for execution by the one or more LLM. The one or more LLM may generate an answer to the prompt based at least in part on the relevant data and the organizational role associated with the user. A configurable interactive component may be selected based at least in part on the organizational role of the user and the prompt to provide the output data for consumption by the user. The configurable interactive component may be provided to the user to provide the user with the output data that is responsive to the prompt. Of course, other implementations of the process 400 may be formed using other features discussed herein, such as features described with reference to FIGS. 1, 2, and 3A-3C.

FIG. 5 is a flow diagram of an example process 500 for responding to a request with a configurable interactive component that performs permissioned actions on behalf of a user, in accordance with disclosed implementations. The process 500 may begin by receiving a natural language prompt from a user, as in 502. The user may be associated with an entity that includes proprietary data accessible by the user via the natural language prompt.

Credentials associated with the user may be received, as in 504. The credentials may be received from the user or from a device associated with the user. In some embodiments, access by the user to a particular device or system may act as credentials or create access to credentials to enable access to data that is protected from access by at least some other people, such as people outside of an entity that is associated with the user. The credentials may be received as a token or other data, such as encrypted data.

A role of the user may be determined, as in 506. The role may be an organizational role or another role of the user. The role may be designated by the user, by an organization, and/or by other users. The role may indicate a type of work or function of the user associated with the role.

A structured graph query may be created based on the natural language prompt, as in 508. The structured graph query may be created by an LLM that processes the natural language prompt to create the query. The structured graph query may be formatted using a graph query language to augment the prompt and return meaningful data for further processing of the prompt by the LLM.

The structured graph query and credentials may be sent for fulfillment using an API, as in 510. The API may make a call to a secure data repository that includes the proprietary data desired by the user. The credentials may be verified by the secure data repository and/or by a gatekeeper to this data, such as the data acquisition server 112 discussed with reference to FIG. 1. The credentials may be used by or verified prior to use of the unified schema that represents the data in the secure data repository.

The relevant data may be received for injection with the prompt, as in 512. For example, the relevant data and the prompt may be injected into instructions for an LLM to process the prompt and create a response to the prompt based at least in part on the relevant data. In some embodiments, the NL prompt and/or the role may be included in the instructions to a create response from the relevant data. The relevant data may be a subset of data from a particular data source, which may be optimized to provide the LLM with essential data and minimize or reduce extraneous data that may not be relevant to the prompt.

The LLM may generate output data as a response to the natural language prompt, as in 514. For example, the LLM may process the natural language prompt to extract and structure certain data included in the relevant data based on the natural language prompt and possibly the role of the user to create a meaningful response. The LLM may utilize information other than the relevant data, such as public data or other data repositories available to the LLM (e.g., the Internet, etc.). However, the LLM may not have access to the relevant data from the secure data repository to respond to prompts from other users that are not associated with the same entity or privileges as the user that submitted the natural language query at the operation 502.

A configurable interactive component may be selected to perform a permissioned requested action for the user, as in 516. For example, the configurable interactive component may be selected based on the NL prompt, the role of the user, the relevant data, and/or identification of an action to be performed (e.g., schedule a meeting, compose/send an electronic communication, submit an approval, etc.). The configurable interactive component may be selected from a library of configurable interactive components. In some embodiments, the configurable interactive component may be populated with information, such as parts of the output data. In various embodiments, the configurable interactive component may include software code to perform certain actions in response to a user action (e.g., selection of a command, etc.) or on behalf of the user in response to the NL prompt. In various embodiments, multiple configurable interactive components may be selected for use with the output data such as when one of the configurable interactive component is a UI to format the data and another configurable interactive component is configured to perform an action.

The configurable interactive component may perform the requested action, as in 518. In some embodiments, the requested action may be performed after user approval, such as selection of a command. The command may initiate the action, such as sending of an electronic communication, scheduling a meeting, annotating media, summitting an approval, modifying data, sharing content, and so forth. The configurable interactive component and the output data may be sent to a user device associated with the user. However, in some embodiments, the system may perform the action in response to the NL prompt with no further input from the user.

A sample implementation of the process 500 may include the following operations. A natural language prompt may be received from a user and by one or more LLM. A role associated with the user may be determined for the user. Credentials of the user may be received that provide the user with permissioned data and/or permissioned actions. One or more LLM may create a structured graph query based on at least one word in the prompt. The structured graph query may extract relevant data from a data repository. The structured graph query may be sent for fulfillment using an API. The relevant data may be received by the API and in response to the structured graph query. The relevant data may be for inclusion with the prompt and for execution by the one or more LLM. The one or more LLM may generate an answer to the prompt based at least in part on the relevant data and the role associated with the user. A configurable interactive component may be selected to perform a permissioned requested action. The configurable interactive component may perform the action on behalf of the user, possibly after selection of a command by the user, or possibly without further action by the user. Of course, other implementations of the process 500 may be formed using other features discussed herein, such as features described with reference to FIGS. 1, 2, and 3A-3C.

FIG. 6 is a flow diagram of an example process 600 for selecting and optionally modifying a configurable interactive component based on user input, according to an implementation. The process 600 may being by selecting a configurable interactive component, as in 602. The configurable interactive component may be selected from a library of configurable interactive components. Example configurable interactive component 602(1)-602(n) may be made available for selection, each described in turn below.

A permission approval component may be selected, as in 602(1). The permission approval component may perform an approval on behalf of the user that creates the NL prompt. The permission approval component may be populated with relevant information by the LLM, the data acquisition component, or both. The relevant information may include a person approving a request, the recipient(s) of the approval (e.g., people, decisions, entities, etc.), credentials indicating authority of the approval, and a location to send or store the approval. The configurable interactive component may be coded and/or otherwise populated with this relevant data and/or other relevant data to perform approvals.

An electronic communication component may be selected, as in 602(2). The electronic communication component may compose and/or send an electronic communication on behalf of the user that creates the NL prompt. The electronic communication component may be populated with relevant information by the LLM, the data acquisition component, or both. The relevant information may include a person that the message is from, the recipient(s) of the electronic message and respective electronic addresses, a message body based on the NL prompt, a format for the message, and a medium to transmit the message. The configurable interactive component may be coded and/or otherwise populated with this relevant data and/or other relevant data to compose and/or send an electronic communication.

A scheduling component may be selected, as in 602(3). The scheduling component may create an invitation or otherwise make an event on behalf of the user that creates the NL prompt. The scheduling component may be populated with relevant information by the LLM, the data acquisition component, or both. The relevant information may include attendees, a location, a time, a date, a description, and a medium for recording the event. The configurable interactive component may be coded and/or otherwise populated with this relevant data and/or other relevant data to compose and/or send an electronic communication.

A media player component may be selected, as in 602(4). The media player component may create, reproduce or otherwise provide media to the user based on the NL prompt. The media player component may be populated with relevant media by the LLM, the data acquisition component, or both. The configurable interactive component may be coded and/or otherwise populated with this relevant media and/or other relevant media to enable playback, edits, annotation, sharing, and/or other actions with the media included in the output data.

A table/chart component may be selected, as in 602(5). The media table/chart component may create, reproduce or otherwise provide output data in a table, chart, or similar format for the user based on the NL prompt. The table/chart component may be populated with relevant media by the LLM, the data acquisition component, or both. The configurable interactive component may be coded and/or otherwise populated with this relevant media and/or other relevant media to enable meaningful interaction with the output data, such as to edit the output data, sort the data, search the data, share the data, and/or perform other manipulations of the data via the formatted output.

Other components may also be selected to format the output data that is responsive to the NL request, as in 602(n). The other components may include a UI framework that creates a general structure or format for the response, as well as individual components that format portions of the output data or otherwise enable the user to undertake actions with the data.

Following selection of the configurable interactive component via the operation 602 and/or 602(1)-(n), the process 600 may advance to a decision operation 604. A determination may be made whether to customize the configurable interactive component, as in 604. When the configurable interactive component is to be customized, following the "yes" route from the decision operation 604, then the process 600 may advance to an operation 606.

The configurable interactive component may be modified or otherwise customized, as in 606. The customization may be based on prior interaction with the configurable interactive component by the user, such as from a prior session and/or prior response to a prior NL prompt. The customization may be based on edits provided by a user to the configurable interactive component. The customization may be based on the NL prompt and/or the role of the user that creates the NL prompt associated with the configurable interactive component. The customization may make changes to, or otherwise configure, the configurable interactive component to create a more meaningful interaction with the user and/or other users. For example, a customization may be to omit controls that are not used by the user in prior sessions with the configurable interactive component. Of course, any number of customizations may be performed based on user input, the NL prompt, other user interactions with the configurable interactive component, and so forth.

Following the operation 606, or when the configurable interactive component is not to be customized, following the "no" route from the decision operation 604, then the process 600 may advance to an operation 608. The selected configurable interactive component may be implemented and made available to the user with the output data, as in 608. For example, the configurable interactive component and the output data may be sent to a user device associated with the user. In some embodiments, the configurable interactive component and the output data may be accessed by the user device, such as via a network and a browser while the configurable interactive component and/or the output data reside on a device that is separate from the user's device, such as a server.

Figure 7:
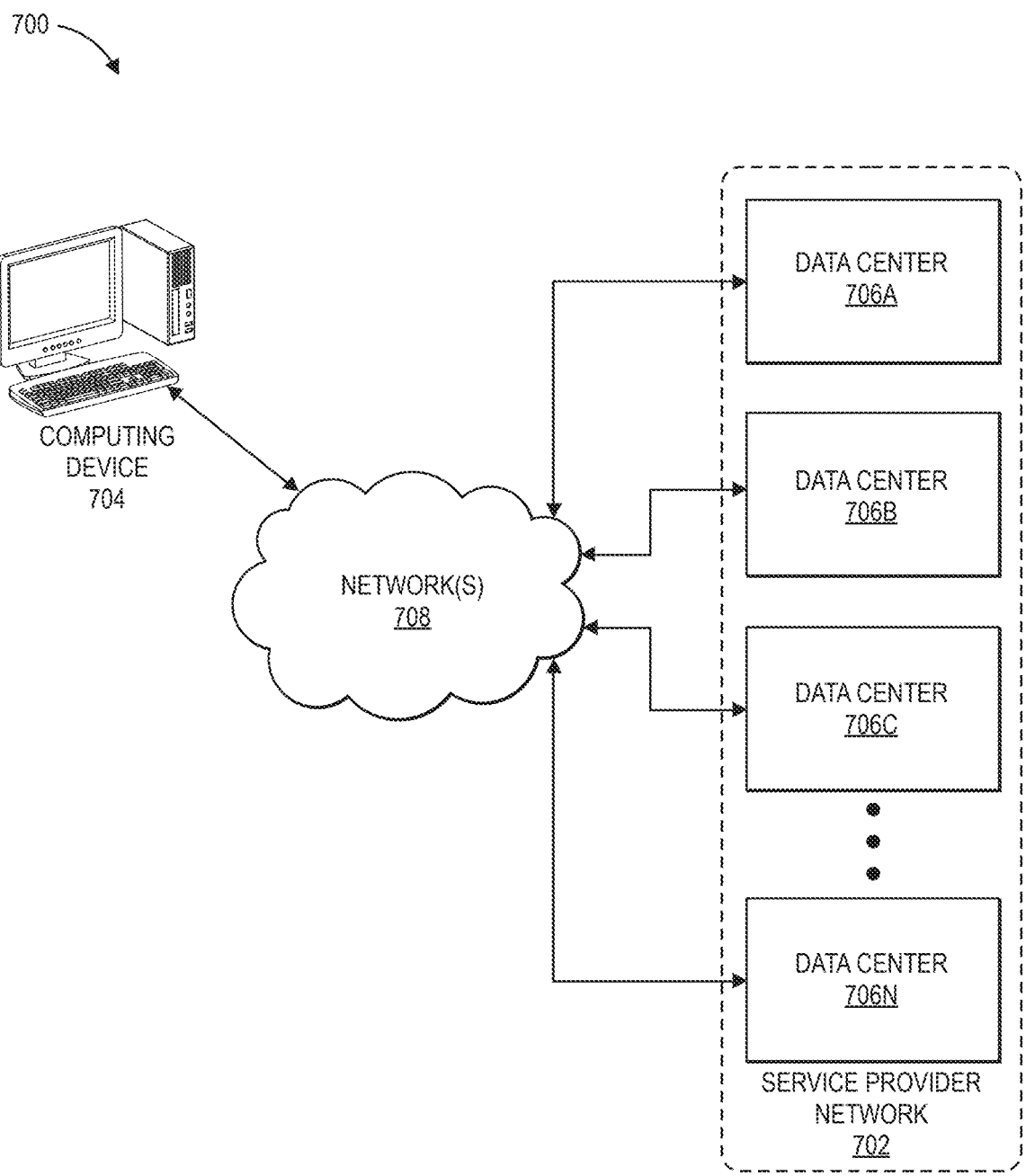
FIG. 7 is a system and network diagram that shows an illustrative operating environment, according to an implementation.

FIG. 7 is a system and network diagram that shows an illustrative operating environment 700 for the configurations disclosed herein, which includes a service provider network 702 that can be configured to perform the techniques disclosed herein and which may be accessed by a computing device 704. Elements of the service provider network 702 can execute various types of computing and network services, such as data storage and data processing, and/or provide computing resources for various types of systems on a permanent or an as-needed basis. For example, among other types of functionality, the computing resources provided by the service provider network 702 may be utilized to implement the various services, for example, services provided by a unified graph gateway, data domains, and/or other elements. Additionally, the operating environment can provide computing resources that include, without limitation, data storage resources, data processing resources, such as virtual machine (VM) instances, networking resources, data communication resources, network services, and other types of resources.

Each type of computing resource provided by the service provider network 702 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 702 can also be configured to provide other types of computing resources not mentioned specifically herein.

The computing resources provided by the service provider network 702 may be enabled in one embodiment by one or more data centers 706A-706N (which might be referred to herein singularly as "a data center 706" or in the plural as "the data centers 706"). The data centers 706 are facilities utilized to house and operate computer systems and associated components. The data centers 706 typically include redundant and backup power, communications, cooling, and security systems. The data centers 706 can also be located in geographically disparate locations. One illustrative embodiment for a data center 706 that can be utilized to implement the technologies disclosed herein will be described below with regard to FIG. 8.

The data centers 706 may be configured in different arrangements depending on the service provider network 702. For example, one or more data centers 706 may be included in, or otherwise make-up, an availability zone. Further, one or more availability zones may make up or be included in a region. Thus, the service provider network 702 may comprise one or more availability zones, one or more regions, and so forth. The regions may be based on geographic areas, such as being located within a predetermined geographic perimeter.

Users and/or owners of the service provider network 702 may access the computing resources provided by the service provider network 702 over any wired and/or wireless network(s) 708, which can be a wide area communication network ("WAN"), such as the Internet, an intranet or an Internet service provider ("ISP") network or a combination of such networks. For example, and without limitation, a computing device, e.g., computing device 704, operated by a user and/or owner of the service provider network 702 may be utilized to access the service provider network 702 by way of the network(s) 708. It should be appreciated that a local-area network ("LAN"), the Internet, or any other networking topology known in the art that connects the data centers 706 to remote customers and other users can be utilized. It should also be appreciated that combinations of such networks can also be utilized.

Each of the data centers 706 may include computing devices that include software, such as applications that receive and transmit data. The data centers 706 can also include databases, data stores, or other data repositories that store and/or provide data. For example, data centers 706 can store data associated with instances of a unified graph gateway, data associated with different data domains, data associated with the cross-domain associations, and/or other elements. In some examples, the data acquisition server 112 may be executed by the computing device 704, and thus access the unified graph gateway via the network(s) 708. In other examples, the data acquisition server 112 may be executed by one or more of the data centers 706 and access an instance of the unified graph gateway executing via one or more other data centers 706 via the network(s) 708. Additionally, in some examples, different data domains may be stored in, and/or may execute in association with, different data centers 706, and the unified graph gateway executing via one or more other data centers 706 can access the data domains via the network(s) 708.

Figure 8:
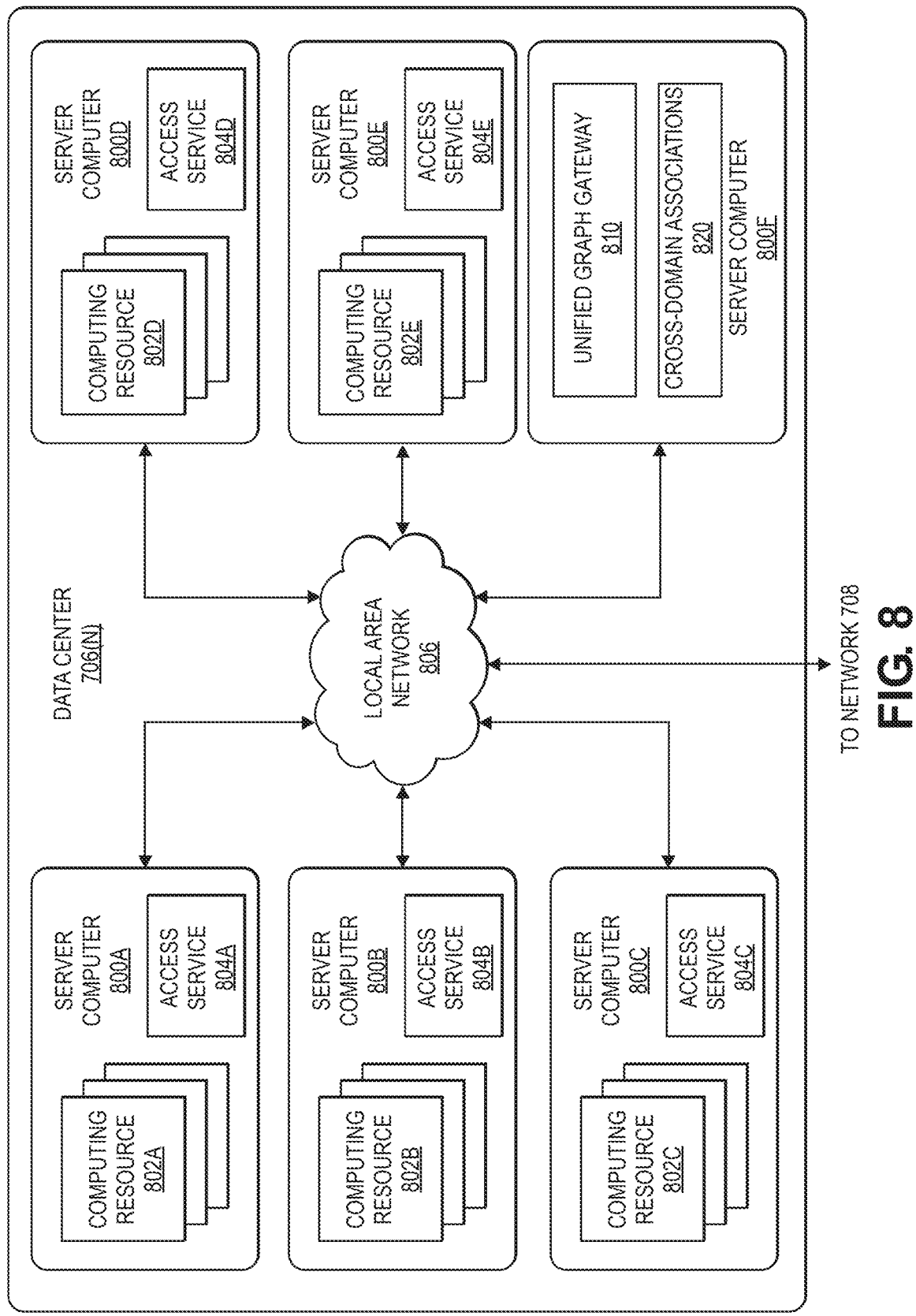
FIG. 8 is a computing system diagram that illustrates a configuration for a data center, according to an implementation.

FIG. 8 is a computing system diagram that illustrates one configuration for a data center 706(N) that can be utilized to implement the system 100, as described above in FIGS. 1-7. The example data center 706(N) shown in FIG. 8 includes several server computers 800A-800E (collectively 800) for providing computing resources 802A-802E (collectively 802), respectively.

The server computers 800 can be standard tower, rackmount, or blade server computers configured appropriately for providing the various computing resources (illustrated in FIG. 8 as the computing resources 802A-802E). The computing resources 802 can include, without limitation, analytics applications, data storage resources, data processing resources such as VM instances or hardware computing systems, database resources, networking resources, and others. Some of the servers 800 can also be configured to execute access services 804A-804E (collectively 804) capable of instantiating, providing and/or managing the computing resources 802, some of which are described in detail herein.

The data center 706(N) shown in FIG. 8 also includes a server computer 800F that can execute some or all of the software components described above, such as a unified graph gateway 810 and cross-domain associations 820. Different data domains may be stored and/or executed via different server computers 800 of the same data center or different data centers, or may be stored and/or executed via the same server computer 800F. The server computer 800F can also be configured to execute other components and/or to store data for providing some or all of the functionality described herein. In this regard, it should be appreciated that components or different instances of the environment 100 described herein can execute on many other physical or virtual servers in the data centers 706 in various configurations.

In the example data center 706(N) shown in FIG. 8, an appropriate LAN 806 is also utilized to interconnect the server computers 800A-800F. The LAN 806 is also connected to the network 708 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 706(A)-(N), between each of the server computers 800A-800F in each data center 706, and, potentially, between computing resources 802 in each of the data centers 706. It should be appreciated that the configuration of the data center 706 described with reference to FIG. 8 is merely illustrative and that other implementations can be utilized.

Figure 9:
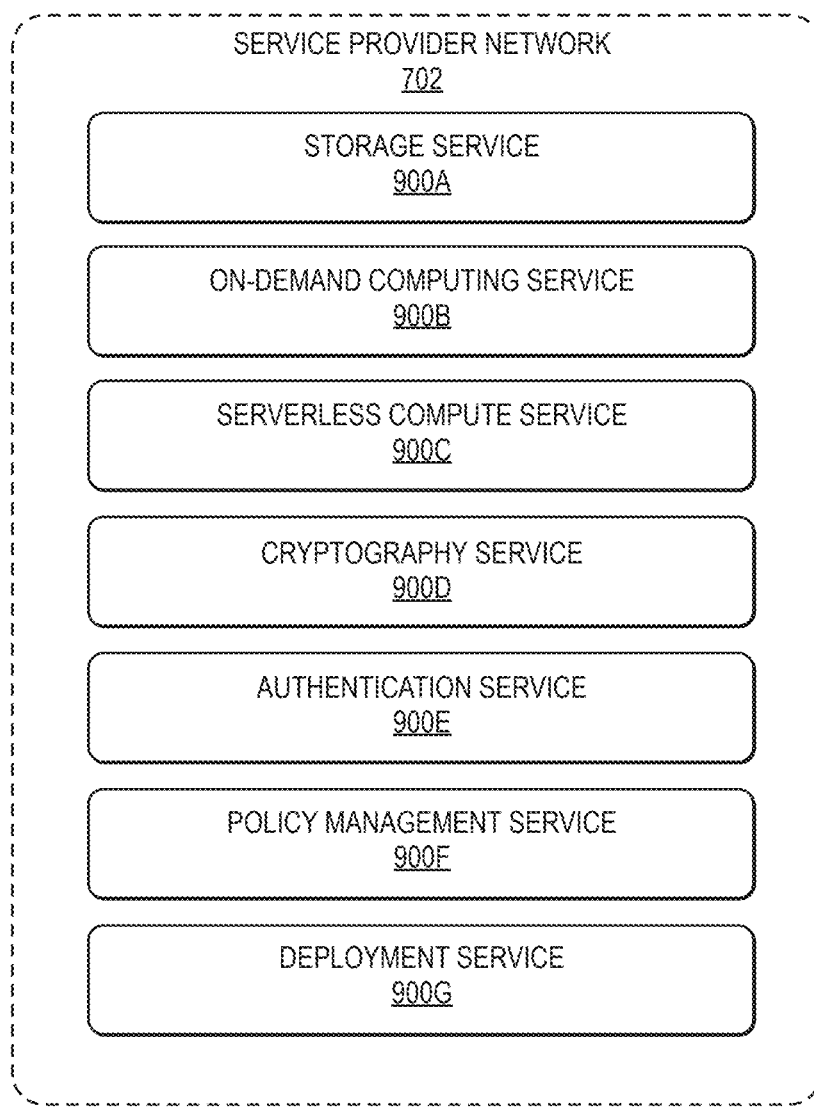
FIG. 9 is a system services diagram that shows aspects of several services that can be provided by and utilized within a service provider network, according to an implementation.

FIG. 9 is a system services diagram that shows aspects of several services that can be provided by and utilized within the service provider network 702, which can be configured to implement the various technologies disclosed herein. The service provider network 702 can provide a variety of services to users including, but not limited to, a unified graph gateway and/or a computing instance performing one or more functions thereof, a storage service 900A, an on-demand computing service 900B, a serverless compute service 900C, a cryptography service 900D, an authentication service 900E, a policy management service 900F, and a deployment service 900G. The service provider network 702 can also provide other types of computing services, some of which are described below.

It is also noted that not all configurations described include the services shown in FIG. 9 and that additional services can be provided in addition to, or as an alternative to, the services explicitly described herein. Each of the systems and services shown in FIG. 9 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 9 will now be provided.

The storage service 900A can be a network-based storage service that stores data obtained from users of the service provider network 702 and/or from computing resources in the service provider network 702. The data stored by the storage service 900A can be obtained from computing devices of users. The data stored by the storage service 900A may also include data associated with data domains, the cross-domain associations, the unified graph schema, the graph schemas, and/or other elements.

The on-demand computing service 900B can be a collection of computing resources configured to instantiate VM instances and to provide other types of computing resources on demand. For example, a user of the service provider network 702 can interact with the on-demand computing service 900B (via appropriately configured and authenticated API calls, for example) to provision and operate VM instances that are instantiated on physical computing devices hosted and operated by the service provider network 702. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 900B is shown in FIG. 9, any other computer system or computer system service can be utilized in the service provider network 702 to implement the functionality disclosed herein, such as a computer system or computer system service that does not employ virtualization and instead provisions computing resources on dedicated or shared computers/servers and/or other physical devices.

The serverless compute service 900C is a network service that allows users to execute code (which might be referred to herein as a "function") without provisioning or managing server computers in the service provider network 702. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The service provider network 702 can also include a cryptography service 900D. The cryptography service 900D can utilize storage services of the service provider network 702, such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein. The cryptography service 900D may be used to support the use of credentials as discussed with reference to at least FIG. 6.

The service provider network 702, in various configurations, also includes an authentication service 900E and a policy management service 900F. The authentication service 900E, in one example, is a computer system (i.e., collection of computing resources) configured to perform operations involved in authentication of users or customers. For instance, one of the services shown in FIG. 9 can provide information from a user or customer to the authentication service 900E to receive information in return that indicates whether or not the requests submitted by the user or the customer are authentic.

The policy management service 900F, in one example, is a network service configured to manage policies on behalf of users or customers of the service provider network 702. The policy management service 900F can include an interface (e.g. API or GUI) that enables customers to submit requests related to the management of a policy, such as a security policy. Such requests can, for instance, be requests to add, delete, change, or otherwise modify policy for a customer, service, or system, or for other administrative actions, such as providing an inventory of existing policies and the like.

The service provider network 702 can additionally maintain other network services based, at least in part, on the needs of its customers. For instance, the service provider network 702 can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The service provider network 702 can also be configured with other network services not specifically mentioned herein in other configurations.

Figure 10:
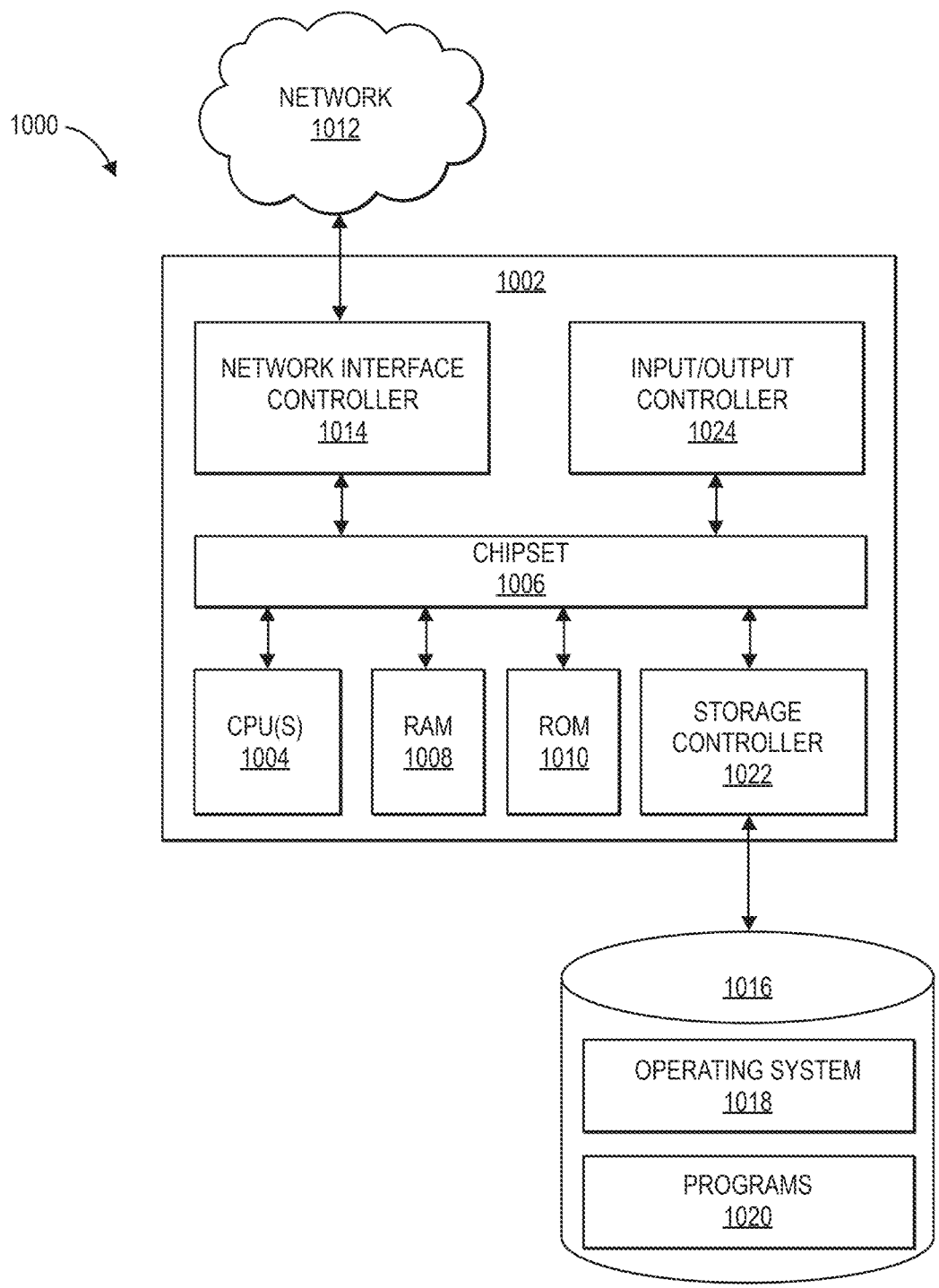
FIG. 10 shows an example computer architecture for a computer capable of executing program components, according to an implementation.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. For example, the computer 1000 can execute one or more instances of the data acquisition server 112.

The computer 1000 includes a baseboard 1002, or "motherboard," which may be one or more printed circuit boards to which a multitude of components and/or devices may be connected by way of a system bus and/or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to start up the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 4, 5, and 6, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
    one or more processors; and
    a memory storing program instructions that when executed by the one or more processors cause the one or more processors to at least:
        receive, from a user and by one or more large language model (LLM), a prompt formed from natural language;
        determine an organizational role associated with the user;
        create, by the one or more LLM, a structured graph query based on at least one word in the prompt and the organizational role, the structured graph query to extract relevant data from a secure data repository that includes a unified graph schema that maps to the relevant data;
        send the structured graph query for fulfillment using an application program interface (API);
        execute the API to determine the relevant data included in the data repository and associated with the at least one word in the prompt;
        receive, by the API and in response to the structured graph query, the relevant data for inclusion with the prompt and for execution by the one or more LLM;
        generate, by the one or more LLM, output data as a response to the prompt based at least in part on the relevant data and the organizational role associated with the user;
        select at least one configurable interactive component to provide the output data, the at least one configurable interactive component selected based at least in part on the organizational role of the user and the prompt; and
        provide the at least one configurable interactive component to the user to provide the user with the output data that is responsive to the prompt.

2. The system of claim 1, wherein:
the at least one configurable interactive component provides a user interface to enable the user to access the output data.

3. The system of claim 1, wherein the program instructions that when executed by the one or more processors further cause the one or more processors to at least:
receive a user selection from the at least one configurable interactive component; and
implement the user selection to perform at least one of:
create a draft communication to send to another user;
approve a request; or
store edited data in a data repository.

4. The system of claim 1, wherein:
the at least one configurable interactive component includes at least one of a table or chart; and
the program instructions that when executed by the one or more processors further cause the one or more processors to at least:
perform at least one data transformation of the relevant data to create the output data that is formatted for the at least one of the table or chart;
populate the table or chart with the output data; and
provide at least one control accessible using the at least one configurable interactive component to enable user interaction with the relevant data.

5. The system of claim 1, wherein:
the at least one configurable interactive component includes a permission approval component; and
the program instructions that when executed by the one or more processors further cause the one or more processors to at least:
receive credentials of the user; and
identify a task to be approved using the permission approval component;
determine that the user has authority to approve the task based at least in part on the credentials; and
perform at least one of:
populate the permission approval component to include the task to be approved; or
execute the permission approval component to approve the task.

6. A method, comprising:
receiving, from a user and by one or more large language model (LLM), a prompt formed from natural language;
determining an organizational role associated with the user;
creating, by the one or more LLM, a structured graph query based on at least one word in the prompt and the organizational role, the structured graph query to extract relevant data from a secure data repository that includes a unified graph schema that maps to the relevant data;
sending the structured graph query for fulfillment using an application program interface (API);
executing the API to determine the relevant data included in the data repository and associated with the at least one word in the prompt;
receiving, by the API and in response to the structured graph query, the relevant data for inclusion with the prompt and for execution by the one or more LLM;
generating, by the one or more LLM, output data as a response to the prompt based at least in part on the relevant data and the organizational role associated with the user;
selecting at least one configurable interactive component to provide the output data, the at least one configurable interactive component selected based at least in part on the organizational role of the user and the prompt; and
providing the at least one configurable interactive component to the user to provide the user with the output data that is responsive to the prompt.

7. The method of claim 6, wherein:
the at least one configurable interactive component provides a user interface to enable the user to access the output data.

8. The method of claim 6, further comprising:
receiving a user selection from the at least one configurable interactive component; and
implementing the user selection to perform at least one of:
create a draft communication to send to another user;
approve a request; or
store edited data in a data repository.

9. The method of claim 6, wherein:
the at least one configurable interactive component includes at least one of a table or chart; and further comprising:
performing at least one data transformation of the relevant data to create the output data that is formatted for the at least one of the table or chart;
populating the table or chart with the output data; and
providing at least one control accessible using the at least one configurable interactive component to enable user interaction with the relevant data.

10. The method of claim 6, wherein:
the at least one configurable interactive component includes a permission approval component; and further comprising:
receiving credentials of the user; and
identifying a task to be approved using the permission approval component;
determining that the user has authority to approve the task based at least in part on the credentials; and
performing at least one of:
populating the permission approval component to include the task to be approved; or
executing the permission approval component to approve the task.

11. The method of claim 6, further comprising:
creating an executable operation for inclusion with the at least one configurable interactive component to enable the user to cause performance of the executable operation with at least some of the output data.

12. The method of claim 6, further comprising:
receiving an input from the user via the at least one configurable interactive component; and
processing the input to cause an executable action to be performed by the at least one configurable interactive component.

13. The method of claim 6, further comprising:
receiving, using the at least one configurable interactive component and from the user, an edit to the output data; and
saving the edit in association with the output data.

14. The method of claim 6, further comprising:
receiving credentials associated with the user; and
providing the credentials to the at least one configurable interactive component to enable the at least one configurable interactive component to perform at least one permissioned action on behalf of the user.

15. The method of claim 6, further comprising:
receiving a user selection from the at least one configurable interactive component; and implementing the user selection using at least some of the output data.

16. A computer-implemented method, comprising:

receiving, from a user and by one or more large language model (LLM), a prompt formed from natural language;

determining an organizational role associated with the user;

creating, by the one or more LLM, a structured graph query based on at least one word in the prompt and the organizational role, the structured graph query to extract relevant data from a secure data repository that includes a unified graph schema that maps to the relevant data;

sending the structured graph query for fulfillment using an application program interface (API);

executing the API to determine the relevant data included in the data repository and associated with the at least one word in the prompt;

receiving, by the API and in response to the structured graph query, the relevant data for inclusion with the prompt and for execution by the one or more LLM;

generating, by the one or more LLM, output data as a response to the prompt based at least in part on the relevant data and the organizational role associated with the user;

selecting at least one configurable interactive component to provide the output data, the at least one configurable interactive component selected based at least in part on the organizational role of the user and the prompt; and providing the at least one configurable interactive component to the user to provide the user with the output data that is responsive to the prompt;

receiving a user selection from the at least one configurable interactive component; and implementing the user selection to perform at least one of:
create a draft communication to send to another user;
approve a request; or
store edited data in a data repository.

17. The computer-implemented method of claim 16, wherein:
the at least one configurable interactive component provides a user interface to enable the user to access the output data.

18. The computer-implemented method of claim 16, further comprising:
receiving credentials associated with the user; and
providing the credentials to the at least one configurable interactive component to enable the configurable interactive component to perform at least one permissioned action on behalf of the user.

19. The computer-implemented method of claim 16, wherein:
the at least one configurable interactive component includes at least one of a table or chart; and further comprising:
performing at least one data transformation of the relevant data to create the output data that is formatted for the at least one of the table or chart;
populating the table or chart with the output data; and
providing at least one control accessible using the at least one configurable interactive component to enable user interaction with the relevant data.

20. The computer-implemented method of claim 16, wherein:
the at least one configurable interactive component includes a permission approval component; and further comprising:
receiving credentials of the user; and
identifying a task to be approved using the permission approval component;
determining that the user has authority to approve the task based at least in part on the credentials; and
performing at least one of:
populating the permission approval component to include the task to be approved; or
executing the permission approval component to approve the task.

* * * * *